United States Patent
Saito

(10) Patent No.: US 9,594,249 B2
(45) Date of Patent: Mar. 14, 2017

(54) IMAGE DISPLAY DEVICE

(71) Applicant: Seiko Epson Corporation, Tokyo (JP)

(72) Inventor: Toshiki Saito, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/323,236

(22) Filed: Jul. 3, 2014

(65) Prior Publication Data
US 2015/0009236 A1   Jan. 8, 2015

(30) Foreign Application Priority Data

Jul. 4, 2013   (JP) ................................. 2013-140424

(51) Int. Cl.
*G09G 5/00* (2006.01)
*G02B 27/01* (2006.01)
*G06T 3/60* (2006.01)
*G06T 3/20* (2006.01)
*G01S 5/16* (2006.01)

(52) U.S. Cl.
CPC ............ *G02B 27/017* (2013.01); *G01S 5/163* (2013.01); *G06T 3/20* (2013.01); *G06T 3/60* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| 8,982,471 | B1* | 3/2015 | Starner et al. ................. 359/630 |
| 2006/0109266 | A1* | 5/2006 | Itkowitz et al. ............... 345/419 |
| 2006/0116185 | A1* | 6/2006 | Krull .................................. 463/4 |
| 2012/0068913 | A1* | 3/2012 | Bar-Zeev et al. ................. 345/8 |
| 2013/0300636 | A1* | 11/2013 | Cunningham .......... G10L 13/02 345/8 |
| 2014/0002341 | A1* | 1/2014 | Nister ..................... G06F 3/013 345/156 |
| 2014/0375540 | A1* | 12/2014 | Ackerman et al. ........... 345/156 |
| 2015/0235632 | A1* | 8/2015 | Liu .......................... G09G 5/38 345/633 |

FOREIGN PATENT DOCUMENTS

JP     2000-312319 A    11/2000

* cited by examiner

*Primary Examiner* — David H Chu
(74) *Attorney, Agent, or Firm* — Harness, Dickey & Pierce, P.L.C.

(57) ABSTRACT

An image display device includes: an image display unit that displays an image; an eyeball position acquiring unit that acquires an orientation of an eye of a viewer relative to a reference position; and an image moving unit that translates the image display unit or an image displayed on the image display unit by a distance corresponding to the acquired orientation of the eye relative to the reference position or rotationally moves the image display unit or the image displayed on the image display unit by an angle corresponding to the acquired orientation of the eye relative to the reference position.

11 Claims, 19 Drawing Sheets

IMAGE DISPLAY DEVICE

BACKGROUND

1. Technical Field

The present invention relates to an image display device.

2. Related Art

JP-A-2000-312319 (Patent Document 1) discloses a head-mounted display that detects, using an attitude sensor attached thereto, an angle at which the head-mounted display is inclined from a horizontal level, and rotates a display image to thereby allow a viewer to view an image that is kept horizontal.

As systems for preventing a blurring of vision caused by the movement of the human head, there are reflex eye movements that are called vestibulo-ocular reflex and optokinetic eye movement. The vestibulo-ocular reflex is a reflex in which the semicircular canals of the inner ear detect head rotation and cause the eyeballs to rotate in a direction opposite to the rotation of the head. The optokinetic eye movement responds slower than the vestibulo-ocular reflex, in which the visual system detects the entire movement of vision and causes the eyeballs to rotate in the same direction as that of the movement. The vestibulo-ocular reflex and the optokinetic eye movement cooperate together to react to head rotation at various speeds, thereby preventing a blurring of vision.

Hence, even when rotation correction of the display image is performed according to the rotation angle of the head as in the invention disclosed in Patent Document 1, there is a problem that an image that is kept accurately horizontal cannot be displayed on the viewer's eyes due to the optokinetic eye movement.

SUMMARY

An advantage of some aspects of the invention is to provide an image display device capable of displaying an image that is kept more accurately horizontal to a viewer.

An aspect of the invention is directed to an image display device including: an image display unit that displays an image; an eyeball position acquiring unit that acquires an orientation of an eye of a viewer relative to a reference position; and an image moving unit that translates the image display unit or an image displayed on the image display unit by a distance corresponding to the acquired orientation of the eye relative to the reference position or rotationally moves the image display unit or the image displayed on the image display unit by an angle corresponding to the acquired orientation of the eye relative to the reference position.

According to the aspect, the orientation of the viewer's eye relative to the reference position is acquired, and the image display unit or the image displayed on the image display unit is translated by the distance corresponding to the acquired orientation of the eye relative to the reference position, or the image display unit or the image displayed on the image display unit is rotationally moved by the angle corresponding to the acquired orientation of the eye relative to the reference position. With this configuration, it is possible to display an image that is kept more accurately horizontal to the viewer.

The image display device may further include a frame that is mounted for use on a head of the viewer, and the image display unit may be provided in the frame. With this configuration, it is possible to provide the image display device as a head-mounted display (head-mounted image display device) mounted for use on the viewer's head.

The image display device may further include a light radiating unit that is provided in the frame and radiates light to the viewer's eye, and the eyeball position acquiring unit may acquire the orientation of the viewer's eye relative to the reference position based on the light radiated by the light radiating unit. With this configuration, it is possible to directly acquire the orientation of the eye relative to the reference position.

The image display device may further include a head inclination acquiring unit that is provided in the frame and acquires an inclination of the viewer's head; and an eyeball information acquiring unit that acquires eyeball information in which an inclination of a head and an orientation of an eye relative to a reference position are associated with each other, and the eyeball position acquiring unit may acquire the orientation of the viewer's eye relative to the reference position based on the inclination of the viewer's head and the eyeball information. With this configuration, it is possible to acquire the orientation of the eye relative to the reference position from the inclination of the head.

The image display device may further include an instruction output unit that outputs, to the eyeball position acquiring unit, an instruction as to whether the orientation of the viewer's eye relative to the reference position is acquired based on the inclination of the viewer's head and the eyeball information or the orientation of the viewer's eye relative to the reference position is acquired based on reflected light of the light radiated to the eye by the light radiating unit. With this configuration, both of accuracy and power saving can be achieved.

The image display device may further include a line-of-sight acquiring unit that acquires a line-of-sight direction of the viewer, and the eyeball position acquiring unit may acquire the orientation of the viewer's eye relative to the reference position based on the line-of-sight direction of the viewer. With this configuration, it is possible to provide the image display device as a portable terminal not capable of acquiring the inclination of the eyeball or the head.

The image display device may further include a driving unit that translates or rotationally moves the image display unit, and the image moving unit may control the driving unit to move the image display unit by an amount corresponding to the orientation of the eye relative to the reference position. With this configuration, it is possible using image processing to display an image that is kept horizontal to the viewer.

In the image display device, the image moving unit may include an image transforming unit that translates or rotationally moves an image displayed on the image display unit by an amount corresponding to the orientation of the eye relative to the reference position, and an image output unit that outputs the image translated or rotationally moved by the image transforming unit to the image display unit. With this configuration, it is possible using a physical method to display an image that is kept horizontal to the viewer.

BRIEF DESCRIPTION OF THE DRAWINGS

The invention will be described with reference to the accompanying drawings, wherein like numbers reference like elements.

FIGS. 1A and 1B show an example of a schematic configuration of an image display device according to a first embodiment of the invention, in which FIG. 1A is a perspective view; and FIG. 1B is a plan view.

FIGS. 4A and 4B show an example of a schematic configuration of a light scanning unit, in which FIG. 4A is a plan view; and FIG. 4B is a cross-sectional view.

DESCRIPTION OF EXEMPLARY EMBODIMENTS

Hereinafter, preferred embodiments of an image display device of the invention will be described with reference to the accompanying drawings.

First Embodiment

A first embodiment of the invention will be described with reference to the drawings.

Figure 1A:
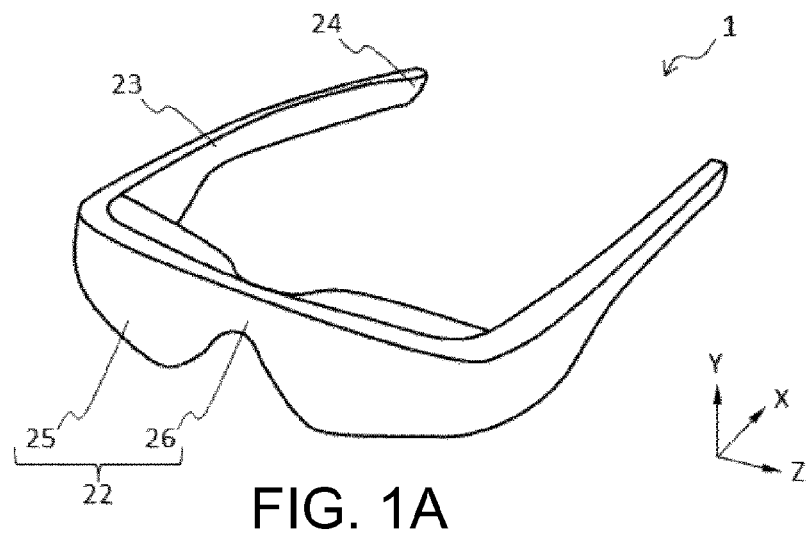
Figure 1B:
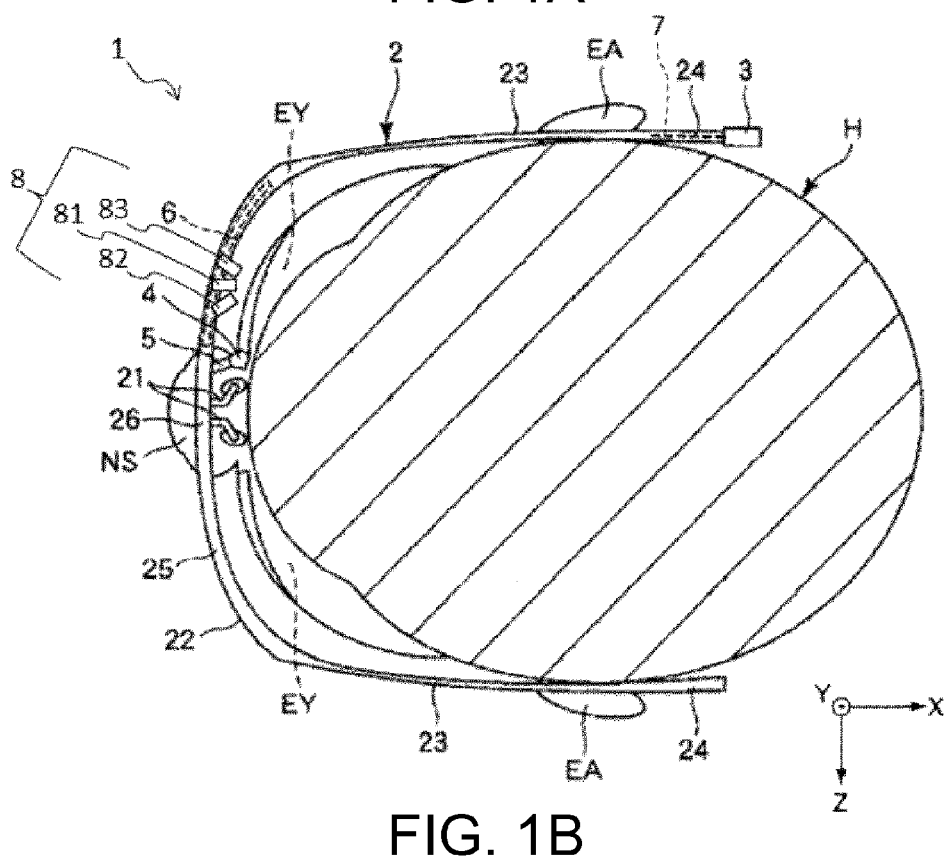

FIGS. 1A and 1B show a schematic configuration of an image display device (head-mounted display) 1 according to the first embodiment of the invention, in which FIG. 1A is a perspective view; and FIG. 1B is a see-through plan view of a main part of the image display device.

The image display device 1 is a head-mounted display (head-mounted image display device) having an eyeglasses-like appearance. The image display device 1 is mounted for use on a head H of a viewer, and allows the viewer to visually recognize an image based on a virtual image with an outside world image superimposed thereon.

In FIGS. 1A and 1B, an X-axis, a Y-axis, and a Z-axis are shown as three axes orthogonal to each other for convenience of description. The tip side of the illustrated arrow of each axis is defined as "positive side" while the base side thereof is defined as "negative side". Moreover, a direction parallel to the X-axis is referred to as "X-axis direction; a direction parallel to the Y-axis is referred to as "Y-axis direction"; and a direction parallel to the Z-axis is referred to as "Z-axis direction". The X-axis, the Y-axis, and the Z-axis are set such that when the image display device 1 described later is mounted on the viewer's head H, the X-axis direction is a front-back direction of the head H, the Y-axis direction is an up-and-down direction of the head H, and the Z-axis direction is a left-and-right direction of the head H.

As shown in FIGS. 1A and 1B, the image display device 1 includes a frame 2, a signal output unit 3, a scanning light emitting unit 4, an impact absorbing unit 5, a reflector 6, an optical fiber 7 (only partially shown in FIGS. 1A and 1B), an eyeball position acquiring unit 8, and a control unit 9 (not shown in FIGS. 1A and 1B).

In the image display device 1, the signal output unit 3 generates signal light modulated corresponding to image information, the optical fiber 7 introduces the signal light to the scanning light emitting unit 4, the scanning light emitting unit 4 two-dimensionally scans the signal light and emits scanning light, and the reflector 6 reflects the scanning light toward eyes EY of the viewer. With this configuration, it is possible to allow the viewer to visually recognize a virtual image corresponding to the image information.

In FIGS. 1A and 1B, the signal output unit 3, the scanning light emitting unit 4, the impact absorbing unit 5, the reflector 6, the optical fiber 7, the eyeball position acquiring unit 8, and the control unit 9 are illustrated only on the right side of the frame 2. However, the same configuration as that of the right side is provided also on the left side of the frame. The description of the left side of the frame 2 is omitted.

Hereinafter, each portion of the image display device 1 will be sequentially described in detail.

Frame

The frame 2 is mounted for use on the viewer's head H, has an eyeglasses frame-like shape, and has a function of supporting the signal output unit 3, the impact absorbing unit 5, and the reflector 6. Moreover, the frame 2 has a function of supporting the optical fiber 7.

As shown in FIGS. 1A and 1B, the frame 2 includes a front portion 22, a pair of temple portions 23, and modern portions 24. The front portion 22 supports the impact absorbing unit 5, the reflector 6, and nose pad portions 21. The temple portions 23 are connected to the front portion 22 and abut on the user's ears. The modern portions 24 are each an end of the temple portion 23 opposite from the front portion 22.

The nose pad portions 21 abut on a nose NS of the viewer at the time of use to support the image display device 1 relative to the viewer's head. The front portion 22 includes rim portions 25 and a bridge portion 26. The nose pad portions 21 are configured to be capable of adjusting the position of the frame 2 relative to the viewer at the time of use.

Signal Generating Unit

Figure 2:
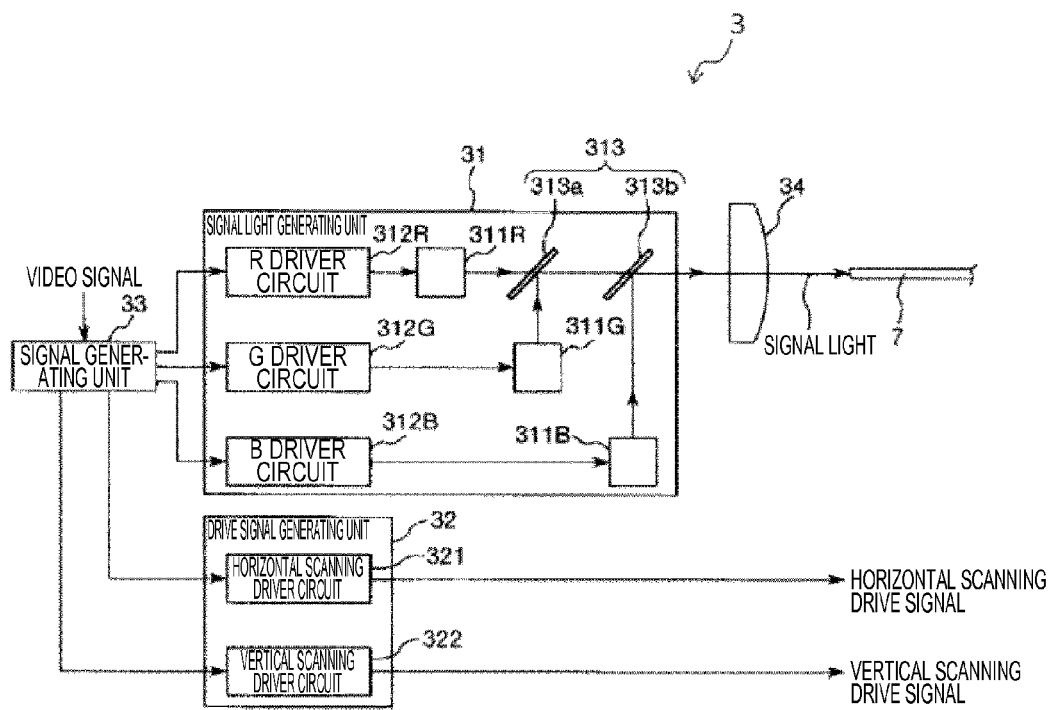
FIG. 2 shows an example of a schematic configuration of a signal output unit.

The signal output unit 3 is attached to the modern portion 24 of the frame 2. FIG. 2 shows an example of a configuration of the signal output unit 3. The signal output unit 3 includes a signal light generating unit 31, a drive signal generating unit 32, a signal generating unit 33, and a lens 34. The signal output unit 3 corresponds to an image output unit according to the invention.

The signal light generating unit 31 generates signal light that is scanned (light scanning) by a light scanning unit (optical scanner) of the scanning light emitting unit 4 described later. The signal light generating unit 31 includes a plurality of light sources 311R, 311G, and 311B different in wavelength, a plurality of driver circuits 312R, 312G, and 312B, and a light combining unit (combining unit) 313.

The light source 311R (R light source) emits red light. The light source 311G (G light source) emits green light. The light source 311B (B light source) emits blue light. With the use of the three color lights, a full-color image can be displayed. The light sources 311R, 311G, and 311B are electrically connected to the driver circuits 312R, 312G, and 312B, respectively. As the light sources 311R, 311G, and 311B, for example, a laser diode or an LED can be used.

The driver circuit 312R has a function of driving the light source 311R. The driver circuit 312G has a function of driving the light source 311G. The driver circuit 312B has a function of driving the light source 311B. The three (three color) lights emitted from the light sources 311R, 311G, and 311B driven by the driver circuits 312R, 312G, and 312B are incident on the light combining unit 313.

The light combining unit 313 combines the lights from the plurality of light sources 311R, 311G, and 311B. With this configuration, it is possible to reduce the number of optical fibers for transmitting the signal light generated by the signal light generating unit 31 to the scanning light emitting unit 4.

The light combining unit 313 includes two dichroic mirrors 313a and 313b. The dichroic mirror 313a has a function of transmitting red light therethrough and reflecting green light. The dichroic mirror 313b has a function of transmitting red light and green light therethrough and reflecting blue light. With the use of the dichroic mirrors 313a and 313b, the three color lights, red light, green light, and blue light, from the light sources 311R, 311G, and 311B are combined to form signal light.

The light combining unit 313 is not limited to the configuration using the dichroic mirror, but may be composed of, for example, an optical waveguide, an optical fiber, or the like.

The signal light generated by the signal light generating unit 31 is incident on one end of the optical fiber 7 via the lens 34. Then, the signal light exits from the other end of the optical fiber 7 and is transmitted to the light scanning unit 42 of the scanning light emitting unit 4 described later.

The lens 34 condenses the signal light generated by the signal light generating unit 31 to input the signal light to the optical fiber 7. The lens 34 is provided as necessary and can be omitted. For example, instead of the lens 34, a lens may be provided between each of the light sources 311R, 311G, and 311B and the light combining unit 313.

The drive signal generating unit 32 generates a drive signal for driving the light scanning unit 42 (optical scanner) of the scanning light emitting unit 4 described later.

The drive signal generating unit 32 includes a driver circuit 321 (first driver circuit) and a driver circuit 322 (second driver circuit). The driver circuit 321 generates a first drive signal used for scanning in a first direction (horizontal scanning) of the light scanning unit 42. The driver circuit 322 generates a second drive signal used for scanning in a second direction (vertical scanning) orthogonal to the first direction of the light scanning unit 42.

The drive signal generating unit 32 is electrically connected via a signal line (not shown) to the light scanning unit 42 of the scanning light emitting unit 4 described later. With this configuration, the drive signals (the first drive signal and the second drive signal) generated by the drive signal generating unit 32 are input to the light scanning unit 42 of the scanning light emitting unit 4 described later.

The driver circuits 312R, 312G, and 312B of the signal light generating unit 31 and the driver circuits 321 and 322 of the drive signal generating unit 32 are electrically connected to the signal generating unit 33.

The signal generating unit 33 has a function of controlling, based on an image signal output from an image deforming unit 93 described later, the driving of the driver circuits 312R, 312G, and 312B of the signal light generating unit 31 and the driver circuits 321 and 322 of the drive signal generating unit 32.

With this configuration, the signal light generating unit 31 generates signal light modulated corresponding to image information, while the drive signal generating unit 32 generates a drive signal corresponding to the image information.

Scanning Light Emitting Unit

The scanning light emitting unit 4 is attached, via the impact absorbing unit 5, in the vicinity of the bridge portion 26 (in other words, in the vicinity of the center of the front portion 22) on the inside of the frame 2. The scanning light emitting unit 4 is arranged so as to be positioned on the viewer's nose NS side of the eye EY at the time of use. The scanning light emitting unit 4 corresponds to the image output unit according to the invention.

Figure 3:
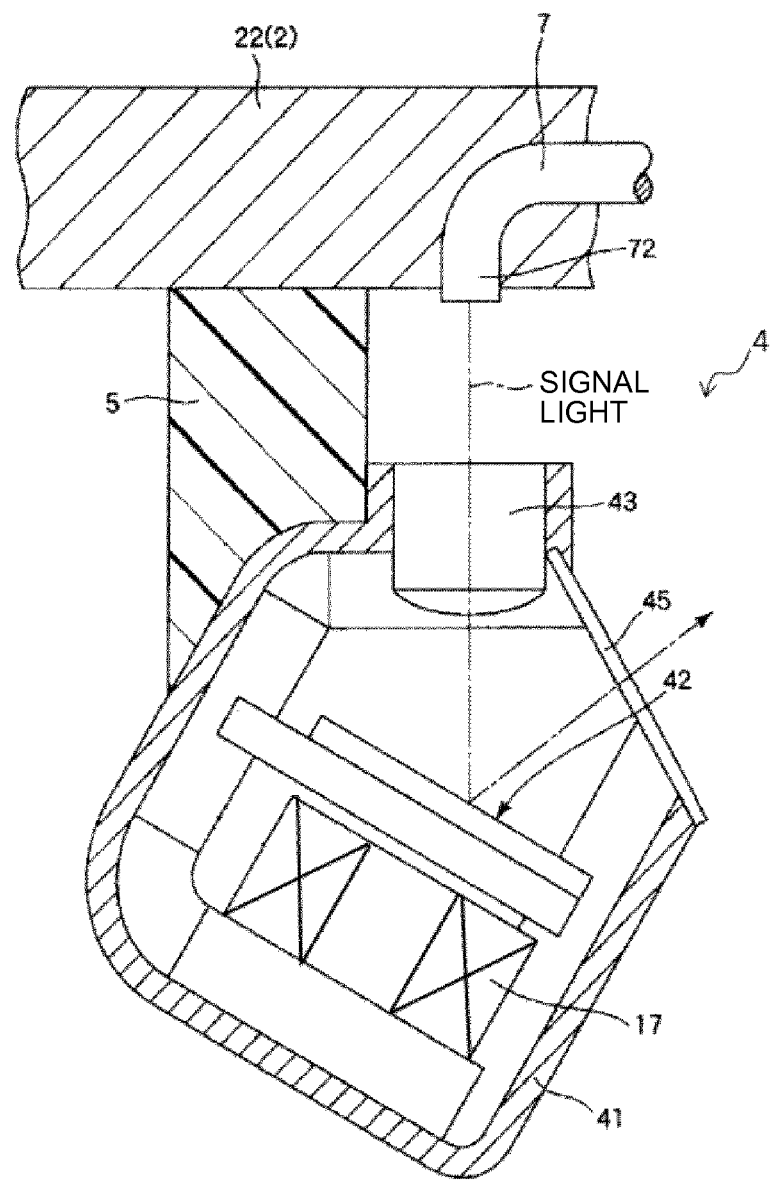
FIG. 3 shows an example of a schematic configuration of a scanning light emitting unit.

FIG. 3 shows the details of the scanning light emitting unit 4. The scanning light emitting unit 4 includes a housing 41, the light scanning unit 42, a lens 43 (coupling lens), and a lens 45 (condensing lens).

The housing 41 supports and accommodates the light scanning unit 42. The housing 41 constitutes a supporting portion that supports the light scanning unit 42.

The lens 43 and the lens 45 are attached to the housing 41. The lenses 43 and 45 constitute portions of the housing 41 (portions of a wall).

The signal light emitted through the optical fiber 7 is incident on the light scanning unit 42 via the lens 43. Hence, the lens 43 constitutes a window portion permeable to the signal light. The signal light that is scanned by the light scanning unit 42 (that is, scanning light) is emitted to the outside of the housing 41 via the lens 45. Hence, the lens 45 constitutes a window portion permeable to the scanning light.

The other end 72 of the optical fiber 7 faces the lens 43 (window portion of the housing 41 transmitting the signal light) in a spaced-apart manner. Since the optical fiber 7 and the housing 41 are spaced apart from each other, it is possible to prevent damage to an optical fiber caused by an excessive stress applied to a connecting portion of the optical fiber with a scanning unit as in the related art. Moreover, even when the housing 41 is displaced relative to the frame 2 by the action of the impact absorbing unit 5 described later, it is possible to prevent or suppress the application of an external force (stress) to the optical fiber 7. Therefore, it is also possible to prevent damage to the optical fiber 7.

The light scanning unit 42 is an optical scanner that two-dimensionally scans the signal light from the signal light generating unit 31. By scanning the signal light with the light scanning unit 42, the scanning light is formed.

Figure 4A:
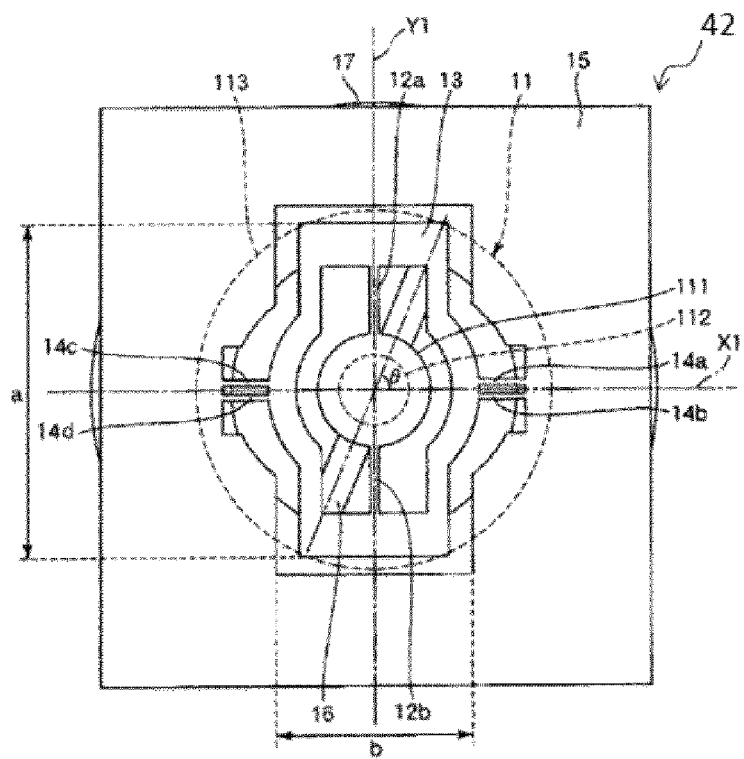
Figure 4B:
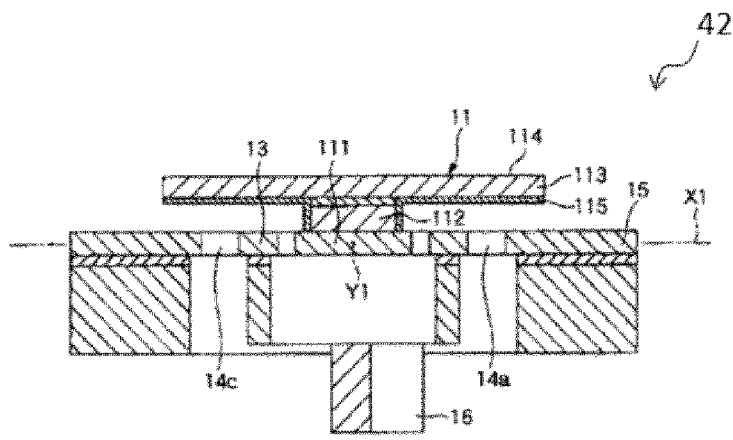

FIGS. 4A and 4B show the details of the light scanning unit 42, in which FIG. 4A is a plan view; and FIG. 4B is a cross-sectional view. The light scanning unit 42 includes a movable mirror portion 11, a pair of axial portions 12a and 12b (first axial portion), a frame body portion 13, two pairs of axial portions 14a, 14b, 14c, and 14d (second axial portion), a support portion 15, a permanent magnet 16, and a coil 17. In other words, the light scanning unit 42 has a so-called gimbal structure. Hereinafter, each portion of the light scanning unit 42 will be sequentially described in detail.

The movable mirror portion 11 includes a base portion 111 (movable portion) and a light reflector 113 fixed to the base portion 111 via a spacer 112. A light reflecting portion 114 having light reflectivity is provided on an upper surface (one of surfaces) of the light reflector 113.

The light reflector 113 is spaced apart from the axial portions 12a and 12b in a thickness direction, and provided to overlap the axial portions 12a and 12b when viewed from the thickness direction (hereinafter referred to also as "plan view", refer to FIG. 4A). Therefore, the area of a plate surface of the light reflector 113 can be increased while reducing a distance between the axial portion 12a and the axial portion 12b. Moreover, since the distance between the axial portion 12a and the axial portion 12b can be reduced, the downsizing of the frame body portion 13 can be achieved. Further, since the downsizing of the frame body portion 13 can be achieved, a distance between the axial portions 14a and 14b and the axial portions 14c and 14d can be reduced. Hence, even when the area of the plate surface of the light reflector 113 is increased, the downsizing of the light scanning unit 42 can be achieved. In other words, the size of the light scanning unit 42 relative to the area of the light reflecting portion 114 can be reduced.

The light reflector 113 is formed so as to entirely cover the axial portions 12a and 12b in the plan view (refer to FIG. 4A). With this configuration, the area of the plate surface of the light reflector 113 is increased, and as a result, the area of the light reflecting portion 114 can be increased. Moreover, it is possible to prevent unwanted light from becoming stray light due to reflection by the axial portions 12a and 12b.

Moreover, the light reflector 113 is formed so as to entirely cover the frame body portion 13 in the plan view. With this configuration, the area of the plate surface of the light reflector 113 is increased, and as a result, the area of the light reflecting portion 114 can be increased. Moreover, it is possible to prevent unwanted light from becoming stray light due to reflection by the frame body portion 13.

Further, the light reflector 113 is formed so as to entirely cover the axial portions 14a, 14b, 14c, and 14d in the plan view (refer to FIG. 4A). With this configuration, the area of the plate surface of the light reflector 113 is increased, and as a result, the area of the light reflecting portion 114 can be increased. Moreover, it is possible to prevent unwanted light from becoming stray light due to reflection by the axial portions 14a, 14b, 14c, and 14d.

In the first embodiment, the light reflector 113 is circular in the plan view (refer to FIG. 4A). The plan-view shape of the light reflector 113 is not limited thereto, and may be, for example, an ellipse, or a polygon such as a quadrilateral.

As shown in FIG. 4B, a hard layer 115 is provided on a lower surface (the other surface) of the light reflector 113. The hard layer 115 is composed of a material harder than a constituent material of a main body of the light reflector 113. With this configuration, the rigidity of the light reflector 113 is enhanced, so that it is possible to prevent or suppress the flexure of the light reflector 113 at the time of oscillation. Moreover, the thickness of the light reflector 113 can be reduced to suppress the moment of inertia of the light reflector 113 at the time of oscillation about an X1 axis and a Y1 axis. The thickness (average) of the hard layer 115 is not particularly limited, and is preferably about from 1 to 10 µm and further preferably about from 1 to 5 µm.

The constituent material of the hard layer 115 is not particularly limited as long as the material is harder than the constituent material of the main body of the light reflector 113. For the formation of the hard layer 115, for example, a chemical vapor deposition (CVD) method, a wet plating method, thermal spraying, bonding of a sheet-like member, or the like can be used.

The hard layer 115 may be composed of a single layer or a stacked body of a plurality of layers. The hard layer 115 is provided as necessary and can be omitted.

The lower surface of the light reflector 113 is fixed to the base portion 111 via the spacer 112. With this configuration, the light reflector 113 can oscillate about the Y1 axis while preventing the contact with the axial portions 12a and 12b, the frame body portion 13, and the axial portions 14a, 14b, 14c, and 14d.

As shown in FIG. 4B, the frame body portion 13 has a frame shape and is provided to surround the base portion 111 of the movable mirror portion 11.

The frame body portion 13 is supported by the support portion 15 via the axial portions 14a, 14b, 14c, and 14d. The base portion 111 of the movable mirror portion 11 is supported by the frame body portion 13 via the axial portions 12a and 12b.

A length of the frame body portion 13 in a direction along the Y1 axis is longer than a length thereof in a direction along the X1 axis. That is, when the length of the frame body portion 13 in the direction along the Y1 axis is a, and the length of the frame body portion 13 in the direction along the X1 axis is b, the relation of a>b is satisfied. With this configuration, the length of the light scanning unit 42 in the direction along the X1 axis can be suppressed while assuring the length necessary for the axial portions 12a and 12b.

Moreover, the frame body portion 13 has a shape along the outer shape of a structure formed of the base portion 111 of the movable mirror portion 11 and the pair of axial portions 12a and 12b in the plan view. With this configuration, the downsizing of the frame body portion 13 can be achieved while permitting vibrations of a first vibrating system composed of the movable mirror portion 11 and the pair of axial portions 12a and 12b, that is, the oscillation of the movable mirror portion 11 about the Y1 axis.

The shape of the frame body portion 13 is not limited to that shown in the drawing as long as the shape is a frame shape surrounding the base portion 111 of the movable mirror portion 11.

Each of the axial portions 12a and 12b and the axial portions 14a, 14b, 14c, and 14d is formed to be elastically deformable. The axial portions 12a and 12b couple the movable mirror portion 11 with the frame body portion 13 so as to allow the movable mirror portion 11 to pivot (oscillate) about the Y1 axis (first axis). The axial portions 14a, 14b, 14c, and 14d couple the frame body portion 13 with the support portion 15 so as to allow the frame body portion 13 to pivot (oscillate) about the X1 axis (second axis) orthogonal to the Y1 axis.

The axial portions 12a and 12b are arranged so as to face each other with the base portion 111 therebetween. Each of the axial portions 12a and 12b has a longitudinal shape extending in the direction along the Y1 axis. Each of the axial portions 12a and 12b is connected at one end to the base portion 111, and connected at the other end to the frame body portion 13. Each of the axial portions 12a and 12b is arranged such that the central axis thereof coincides with the Y1 axis. Each of the axial portions 12a and 12b is torsionally deformed in association with the oscillation of the movable mirror portion 11 about the Y1 axis.

The axial portions 14a and 14b and the axial portions 14c and 14d are arranged so as to face each other with the frame body portion 13 (interposed) therebetween. Each of the axial portions 14a, 14b, 14c, and 14d has a longitudinal shape extending in the direction along the X1 axis. Each of the axial portions 14a, 14b, 14c, and 14d is connected at one end to the frame body portion 13, and connected at the other end to the support portion 15. The axial portions 14a and 14b are arranged so as to face each other with the X1 axis therebetween. Similarly, the axial portions 14c and 14d are arranged so as to face each other with the X1 axis therebetween. The axial portions 14a, 14b, 14c, and 14d are configured such that each of the whole of the axial portions 14a and 14b and the whole of the axial portions 14c and 14d is torsionally deformed in association with the oscillation of the frame body portion 13 about the X1 axis.

As described above, the movable mirror portion 11 is oscillatable about the Y1 axis, while the frame body portion 13 is oscillatable about the X1 axis. Therefore, the movable mirror portion 11 can oscillate (reciprocally pivot) about two axes, the X1 axis and the Y1 axis, orthogonal to each other.

For example, an angle detection sensor such as a strain sensor is provided in at least one of the axial portions 12a and 12b and at least one of the axial portions 14a, 14b, 14c, and 14d. The angle detection sensor can detect angle information of the light scanning unit 42, more specifically, oscillation angles of the light reflecting portion 114 about the X1 axis and the Y1 axis. The detection result is input to the signal generating unit 33 via a cable (not shown).

The shape of each of the axial portions 12a and 12b and the axial portions 14a, 14b, 14c, and 14d is not limited to that described above, and may have, for example, a bent or curved portion or a branched portion at at least one place in the middle of the axial portion.

The base portion 111, the axial portions 12a and 12b, the frame body portion 13, the axial portions 14a, 14b, 14c, and 14d, and the support portion 15 are integrally formed. In the first embodiment, the base portion 111, the axial portions 12a and 12b, the frame body portion 13, the axial portions 14a, 14b, 14c, and 14d, and the support portion 15 are formed by etching an SOI substrate having a first Si layer (device layer), an $SiO_2$ layer (BOX layer), and a second Si layer (handle layer) stacked in this order. With this configuration, vibration characteristics of the first vibrating system and a second vibrating system can be made excellent. Moreover, microfabrication can be performed by etching on the SOI substrate. Therefore, by forming the base portion 111, the axial portions 12a and 12b, the frame body portion 13, the axial portions 14a, 14b, 14c, and 14d, and the support portion 15 using the SOI substrate, their dimensional accuracies can be made excellent, and the downsizing of the light scanning unit 42 can be achieved.

Each of the base portion 111, the axial portions 12a and 12b, and the axial portions 14a, 14b, 14c, and 14d is composed of the first Si layer of the SOI substrate. With this configuration, the elasticity of the axial portions 12a and 12b and the axial portions 14a, 14b, 14c, and 14d can be made excellent. Moreover, when the base portion 111 pivots about the Y1 axis, the base portion 111 can be prevented from contacting the frame body portion 13.

Each of the frame body portion 13 and the support portion 15 is composed of a stacked body formed of the first Si layer, the $SiO_2$ layer, and the second Si layer of the SOI substrate. With this configuration, the rigidity of the frame body portion 13 and the support portion 15 can be made excellent. Moreover, the $SiO_2$ layer and the second Si layer of the frame body portion 13 have not only a function as a rib that enhances the rigidity of the frame body portion 13 but also a function of preventing the movable mirror portion 11 from contacting the permanent magnet 16.

It is preferable that an upper surface of the support portion 15 is subjected to antireflection treatment. With this configuration, it is possible to prevent unwanted light radiated to the support portion 15 from becoming stray light. The antireflection treatment is not particularly limited, and examples thereof include, for example, the formation of an antireflection film (dielectric multilayer film), surface roughening, and surface blackening.

The constituent material and forming method of the base portion 111, the axial portions 12a and 12b, and the axial portions 14a, 14b, 14c, and 14d are illustrative only, and the invention is not limited thereto.

The spacer 112 and the light reflector 113 are formed also by etching an SOI substrate. The spacer 112 is composed of a stacked body formed of an $SiO_2$ layer and a second Si layer of the SOI substrate. The light reflector 113 is composed of a first Si layer of the SOI substrate.

As described above, the spacer 112 and the light reflector 113 are formed using the SOI substrate, so that the spacer 112 and the light reflector 113 that are joined together can be simply manufactured with high accuracy. The spacer 112 is bonded to the base portion 111 by means of, for example, a bonding material (not shown) such as an adhesive or a brazing material.

The permanent magnet 16 is bonded to a lower surface (surface on the side opposite to the light reflector 113) of the frame body portion 13. The method of bonding the permanent magnet 16 to the frame body portion 13 is not particularly limited, and for example, a bonding method using an adhesive can be used.

The permanent magnet 16 is magnetized in a direction inclined to the X1 axis and the Y1 axis in the plan view. In the first embodiment, the permanent magnet 16 has a longitudinal shape (rod-like shape) extending in the direction inclined to the X1 axis and the Y1 axis. The permanent magnet 16 is magnetized in the longitudinal direction. That is, the permanent magnet 16 is magnetized such that one end thereof is the south pole and the other end is the north pole. The permanent magnet 16 is provided in the plan view so as to be symmetrical about an intersection point of the X1 axis and the Y1 axis.

In the first embodiment, an example is described in which one permanent magnet is placed on the frame body portion 13. However, the invention is not limited thereto. For example, two permanent magnets may be placed on the frame body portion 13. In this case, for example, two permanent magnets having a longitudinal shape are placed on the frame body portion so as to face each other with the base portion 111 therebetween in the plan view and be parallel to each other.

As the permanent magnet 16, for example, a neodymium magnet, a ferrite magnet, a samarium-cobalt magnet, an alnico magnet, a bonded magnet, or the like can be preferably used. The permanent magnet 16 is obtained by magnetizing a hard magnetic substance, and formed by, for example, placing a hard magnetic substance before magnetization on the frame body portion 13 and then magnetizing the hard magnetic substance. This is because when the permanent magnet 16 that has been already magnetized is intended to be placed on the frame body portion 13, the permanent magnet 16 cannot be placed at a desired position in some cases due to an influence of an external magnetic field or magnetic fields of other components.

Just below the permanent magnet 16, the coil 17 (refer to FIG. 3) is provided. With this configuration, a magnetic field generated from the coil 17 can efficiently act on the permanent magnet 16. With this configuration, the energy saving and downsizing of the light scanning unit 42 can be achieved.

The coil 17 is electrically connected to a signal superimposing unit. The signal superimposing unit includes an adder (not shown) that superimposes the first drive signal and the second drive signal on each other, and applies the superimposed voltage to the coil 17. Then, with the first drive signal, two magnetic fields are alternately switched: one of the magnetic fields attracts one end (the north pole) of the permanent magnet 16 to the coil 17 while causing the other end (the south pole) of the permanent magnet 16 to move away from the coil 17 (this magnetic field is referred to as "magnetic field A1"); and the other magnetic field causes the one end (the north pole) of the permanent magnet 16 to move away from the coil 17 while attracting the other end (the south pole) of the permanent magnet 16 to the coil 17 (this magnetic field is referred to as "magnetic field A2").

The permanent magnet 16 is arranged such that the respective ends (magnetic poles) thereof are positioned in two areas divided by the Y1 axis. Therefore, with the alternate switching of the magnetic field A1 and the magnetic field A2, a vibration having a torsional vibration component about the Y1 axis is excited in the frame body portion 13. In association with the vibration, the movable mirror portion 11 pivots about the Y1 axis at the frequency of the first drive signal while torsionally deforming the axial portions 12a and 12b.

On the other hand, with the second drive signal, two magnetic fields are alternately switched: one of the magnetic fields attracts the one end (the north pole) of the permanent magnet 16 to the coil 17 while causing the other end (the south pole) of the permanent magnet 16 to move away from the coil 17 (this magnetic field is referred to as "magnetic field B1"); and the other magnetic field causes the one end (the north pole) of the permanent magnet 16 to move away from the coil 17 while attracting the other end (the south pole) of the permanent magnet 16 to the coil 17 (this magnetic field is referred to as "magnetic field B2").

The permanent magnet 16 is arranged such that the respective ends (magnetic poles) thereof are positioned in two areas divided by the X1 axis. Therefore, with the alternate switching of the magnetic field B1 and the magnetic field B2, the frame body portion 13 pivots, together with the movable mirror portion 11, about the X1 axis at the frequency of the second drive signal while torsionally deforming each of the axial portions 14a and 14b and the axial portions 14c and 14d.

The light scanning unit 42 includes the light reflecting portion 114 having light reflectivity. Signal light emitted through the optical fiber 7 is incident on the light reflecting portion 114 via the lens 43. With this configuration, the signal light is two-dimensionally scanned by the light scanning unit 42.

The lens 43 has a function of adjusting the spot diameter of the signal light emitted through the optical fiber 7. Moreover, the lens 43 has also a function of adjusting the radiation angle of the signal light emitted through the optical fiber 7 to substantially collimate the signal light.

The signal light that is scanned by the light scanning unit 42 (that is, scanning light) is emitted to the outside of the housing 41 via the lens 45.

The lens 45 is provided between the light scanning unit 42 and the reflector 6. The lens 45 is a single lens that condenses, between the light scanning unit 42 and the reflector 6, the signal light from the light scanning unit 42 so that the signal light reflected by the reflector 6 becomes parallel light. That is, it can be said that the lens 45 constitutes a focus adjusting portion that adjusts an image forming point (light condensing position) of the signal light corresponding to a position to be scanned so that the signal light reflected by the reflector 6 becomes parallel light. By providing the lens 45, the flexibility of design of the attitude, shape, or the like of the reflector 6 is increased.

Impact Absorbing Unit

The impact absorbing unit 5 connects the frame 2 with the housing 41 and has a function of absorbing an impact from the frame 2 to the light scanning unit 42. With this configuration, damage to the light scanning unit 42 can be prevented. In the first embodiment, the impact absorbing unit 5 is attached to the front portion 22 of the frame 2 as shown in FIG. 3.

The impact absorbing unit 5 is composed of an elastic member. With this configuration, the configuration of the impact absorbing unit 5 can be made relatively simple. The impact absorbing unit 5 is block-like.

The shape, number, size, and the like of the impact absorbing unit 5 are not limited to those shown in the drawing. The constituent material of the impact absorbing unit 5 is determined according to the shape or size of the impact absorbing unit 5 and the mass, size, shape, or the like of the scanning light emitting unit 4, and is not particularly limited.

An outer surface of the housing 41 of the scanning light emitting unit 4 is bonded to a portion of the impact absorbing unit 5 on the side opposite to the frame 2. With this configuration, the housing 41 can be supported relative to the frame 2 via the impact absorbing unit 5 in a state where the housing 41 is spaced apart from the frame 2. Hence, the impact absorbing unit 5 absorbs an impact from the frame 2 to the light scanning unit 42, so that damage to the light scanning unit 42 can be prevented.

Reflector

As shown in FIGS. 1A and 1B, the reflector 6 is attached to the rim portion 25 included in the front portion 22 of the frame 2. The reflector 6 corresponds to an image display unit according to the invention.

Figure 5:
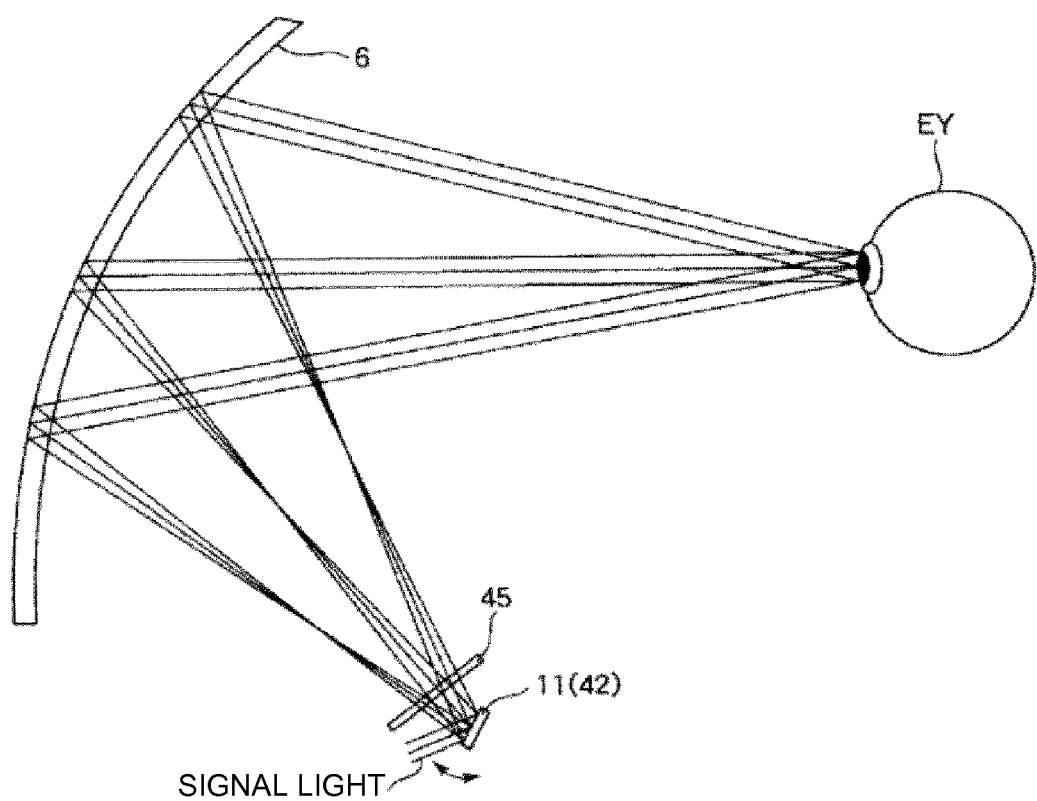
FIG. 5 shows a method of displaying an image on a reflector.

FIG. 5 schematically shows the reflector 6. The reflector 6 has a function of reflecting signal light from the light scanning unit 42 toward the viewer's eye. In the first embodiment, the reflector 6 is a half mirror and has a function of transmitting outside world light therethrough (light-transmissive property relative to visible light). That is, the reflector 6 has a function of reflecting the signal light from the light scanning unit 42 and transmitting therethrough the outside world light directed from the outside of the reflector 6 toward the viewer's eye at the time of use. With this configuration, the viewer can visually recognize a virtual image (image) formed by the signal light while visually recognizing an outside world image. That is, a see-through type head-mounted display can be realized.

For example, the reflector 6 may include a diffraction grating. Moreover, the reflector 6 may be obtained by, for example, forming a semi-transmissive reflection film composed of a metal thin film, a dielectric multilayer film, or the like formed on a transparent substrate.

The reflector 6 is arranged to be inclined in a direction from the viewer's nose NS side toward an ear EA side, at the time of use, relative to the eye width direction. In other words, the reflector 6 has a curved shape along the curve of the frame 2 and along the contour of the face from the viewer's nose NS side toward the ear EA side at the time of use. That is, the reflecting surface of the reflector 6 has a concaved curved surface shape. With this configuration, the downsizing of the image display device 1 can be achieved, and the designability of the image display device 1 can be enhanced. Moreover, the signal light from the light scanning unit 42 can be easily reflected by the reflector 6 toward the viewer's eye EY at the time of use.

Optical Fiber

The optical fiber 7 has a function of introducing signal light emitted from the signal light generating unit 31 of the signal output unit 3 described above to the scanning light emitting unit 4. With the used of the optical fiber 7, the freedom of setting position of the signal light generating unit 31 is increased.

The optical fiber 7 is supported by the frame 2. In the first embodiment, the optical fiber 7 is embedded in the frame 2 along the temple portion 23 of the frame 2. The optical fiber 7 may be bonded to an outer surface of the frame 2.

The signal light generating unit 31 is optically connected to one end (end on the side on which signal light is incident) of the optical fiber 7, and signal light is incident thereon. With this configuration, the signal light is transmitted toward the other end 72 of the optical fiber 7.

On the other hand, the other end 72 (end on the side through which signal light is emitted, refer to FIG. 3) of the optical fiber 7 is optically connected to the scanning light emitting unit 4, and signal light is emitted to the scanning light emitting unit 4. With this configuration, the signal light is incident on the scanning light emitting unit 4.

Especially the other end 72 (refer to FIG. 3) of the optical fiber 7 is exposed, at a position facing the scanning light emitting unit 4 and in a spaced-apart manner from the scanning light emitting unit 4, to the outside from an inner surface of the front portion 22 of the frame 2 (refer to FIG. 3).

In the first embodiment, the optical fiber 7 and the housing 41 are spaced apart from each other. Therefore, even when the housing 41 is displaced relative to the frame 2 by the action of the impact absorbing unit 5, it is possible to prevent or suppress the application of an external force to the optical fiber 7. Therefore, damage to the optical fiber 7 can also be prevented.

Eyeball Position Acquiring Unit

The eyeball position acquiring unit 8 includes mainly an infrared ray emission unit 81 and photodiodes 82 and 83. As shown in FIGS. 1A and 1B, the infrared ray emission unit 81 and the photodiodes 82 and 83 are provided at the rim portion 25 included in the front portion 22 of the frame 2. The infrared ray emission unit 81 and the photodiodes 82 and 83 are provided on, for example, a top surface of the frame 2 so as not to overlap the reflector 6.

Figure 6:
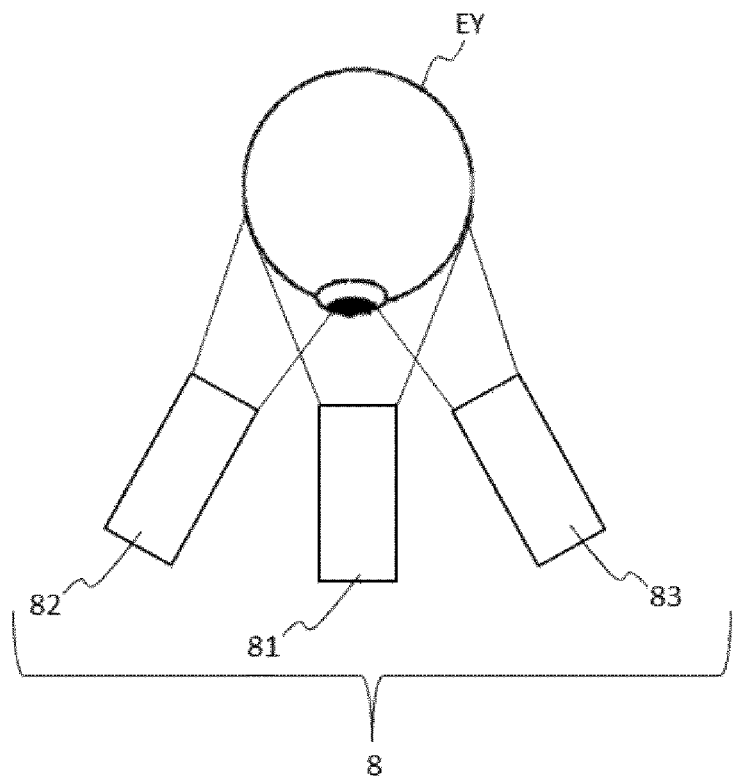
FIG. 6 shows a relation between an eyeball position acquiring unit and an eye.

FIG. 6 shows a positional relation between the viewer's eye EY and the eyeball position acquiring unit 8.

The infrared ray emission unit 81 emits an infrared ray and radiates the infrared ray to the viewer's eye EY. The infrared ray emission unit 81 is provided at a position where the infrared ray emission unit 81 can radiate light to a boundary between a dark part (the iris and pupil of the eye) and the white of the viewer's eye EY. In the first embodiment, an LED that can emit an infrared ray can be used. However, the infrared ray emission unit 81 is not limited thereto.

The photodiodes 82 and 83 are respectively provided on both sides of the infrared ray emission unit 81. The photodiodes 82 and 83 are provided such that the light acquiring range thereof covers the boundary between the dark part and the white of the viewer's eye EY. The photodiodes 82 and 83 acquire reflected light of the infrared ray that is radiated from the infrared ray emission unit 81 and reflected by the viewer's eye EY.

The reflectance is different between the dark part and the white of the eye. Therefore, by acquiring the reflected infrared light with the photodiodes 82 and 83, the orientation of the eye can be acquired by an eyeball position calculating unit 92 described later. The reflected light acquired by the photodiodes 82 and 83 is output to the control unit 9.

Control Unit

The control unit 9 is provided in the frame 2 at, for example, a position next to the signal output unit 3. The control unit 9 is electrically connected with the signal output unit 3 and the eyeball position acquiring unit 8.

Figure 7:
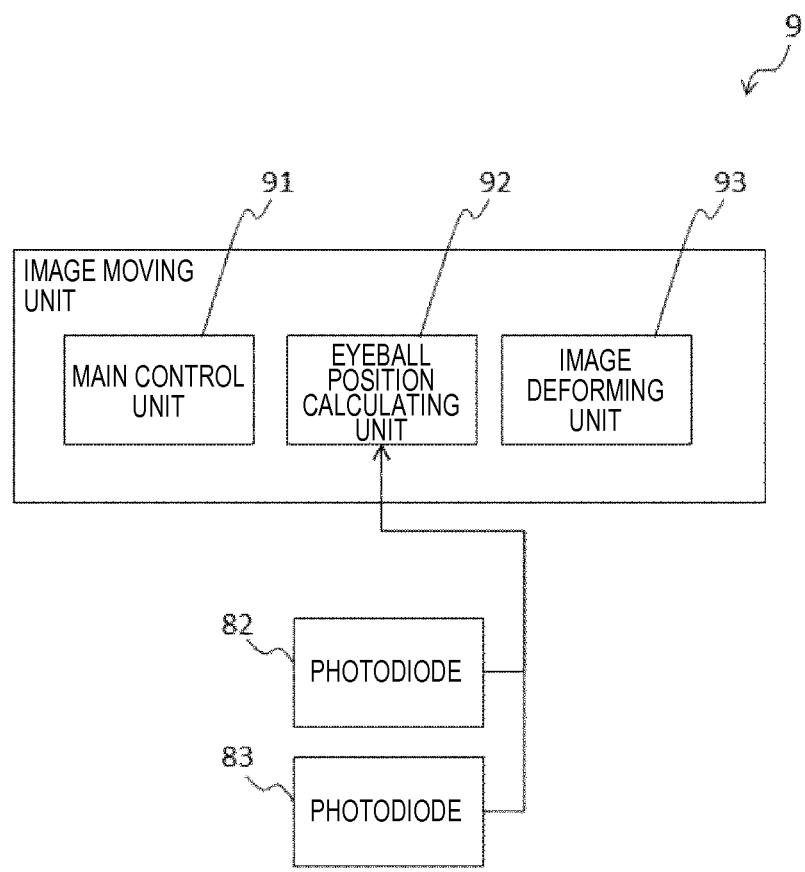
FIG. 7 shows an example of a functional configuration of a control unit.

FIG. 7 shows an example of a functional configuration of the control unit 9. The control unit 9 includes mainly a main control unit 91, the eyeball position calculating unit 92, and the image deforming unit 93.

The main control unit 91 controls the whole of the control unit 9.

The eyeball position calculating unit 92 acquires the reflected light acquired by the photodiodes 82 and 83. Moreover, the eyeball position calculating unit 92 calculates, based on the acquired reflected light, the position of the dark part of the viewer's eye EY, that is, the orientation of the eye EY relative to a reference position. The eyeball position calculating unit 92 can calculate the orientation of the eye EY relative to the reference position using a so-called limbus tracking method. The limbus tracking method is a common technique, and therefore, the description thereof is omitted. The eyeball position calculating unit 92 corresponds to an eyeball position acquiring unit according to the invention.

The image deforming unit 93 acquires an image signal from an external storage device 903 (refer to FIG. 8) or the like, and deforms the image signal based on the orientation of the eye EY relative to the reference position calculated by the eyeball position calculating unit 92. The image deforming unit 93 corresponds to an image moving unit according to the invention.

The processing performed by the control unit 9 will be described in detail later.

Figure 8:
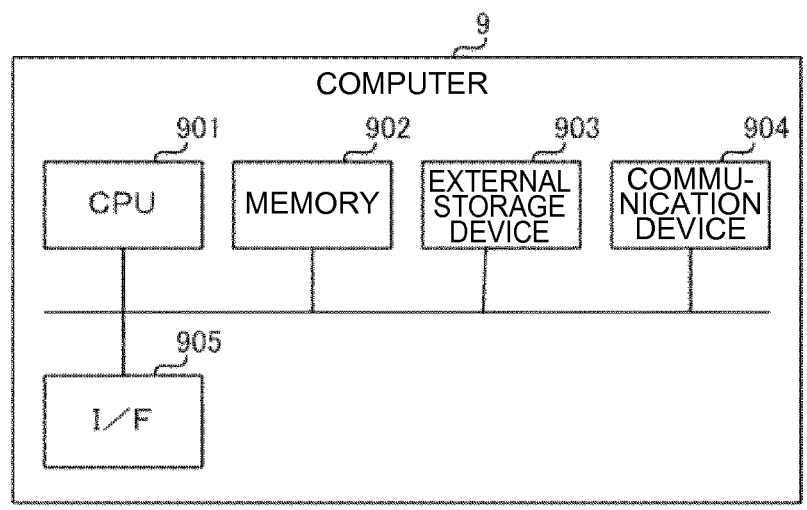
FIG. 8 is a block diagram showing an example of a schematic configuration of the control unit.

FIG. 8 is a block diagram showing an example of a schematic configuration of the control unit 9. As shown in the drawing, the control unit 9 composed of, for example, a computer includes mainly a CPU (Central Processing Unit) 901 as an arithmetic device, a memory 902 formed of a RAM (Random Access Memory) as a volatile storage device or a ROM (Read only Memory) as a non-volatile storage device, the external storage device 903, a communication device 904 communicating with an external device, and an interface (I/F) 905 for connection with another unit.

Each functional portion is realized such that for example, the CPU 901 reads a predetermined program stored in the external storage device 903 or the like into the memory 902 or the like and executes the program. For example, the predetermined program may be previously installed in the external storage device 903 or the like, or downloaded via the communication device 904 to be installed or updated.

The main configuration of the image display device 1 has been described above for explaining the features of the first embodiment, and the image display device 1 is not limited to the above configuration. The invention is not limited by the way of classifying constituent elements or by their names. The configuration of the image display device 1 can be classified into more constituent elements according to the content of processing. Moreover, the classification can be made such that one constituent element performs more processing. The processing of each constituent element may be executed by one piece of hardware or a plurality of pieces of hardware.

Next, distinctive processing of the image display device 1 configured as described above in the first embodiment will be described.

Figure 9:
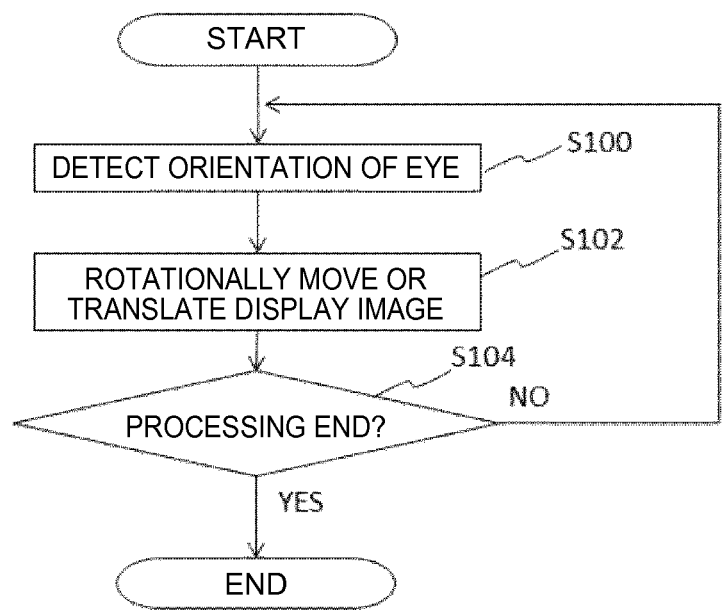
FIG. 9 is a flowchart showing the flow of image moving processing of the image display device.

FIG. 9 is a flowchart showing the flow of processing to move an image based on the orientation of the viewer's eye EY relative to the reference position. This processing starts at any timing, for example, with the input of an instruction, via a button or the like (not shown), to start image display.

The processing shown in FIG. 9 is performed by the eyeball position acquiring unit 8 and the control unit 9 that are provided on each of the right and left sides of the frame 2 at the same timing.

The eyeball position calculating unit 92 acquires reflected light acquired by the photodiodes 82 and 83, and calculates the orientation of the eye EY relative to the reference position (Step S100). The processing in Step S100 will be specifically described. In the first embodiment, the eyeball position calculating unit 92 determines whether the orientation of the viewer's eye EY relative to the reference position is in the up, down, left, and right directions or in oblique directions.

For example, information indicating the reference position (the position of the dark part of the eye when the eye EY faces the front) of the eye EY, the horizontal direction, and the vertical direction is stored in the memory 902. The eyeball position calculating unit 92 obtains the position of the dark part of the eye from the reflected light. By comparing the obtained position of the dark part of the eye with the information acquired from the memory 902, the eyeball position calculating unit 92 can obtain the orientation of the eye EY relative to the reference position. For example, when the obtained position of the dark part of the eye is present on a line in the horizontal direction including the reference position of the eye EY, or on a line in the vertical direction including the reference position of the eye EY, the eyeball position calculating unit 92 can determine that the orientation of the viewer's eye EY relative to the reference position is in the up, down, left, and right directions. In other cases, the eyeball position calculating unit 92 can determine that the orientation of the viewer's eye EY relative to the reference position is in an oblique direction.

When the orientation of the viewer's eye EY relative to the reference position is in an oblique direction, the eyeball position calculating unit 92 calculates an angle θ formed between a vector (for example, an arrow directed from the reference position to the position of the dark part of the eye) indicating the orientation of the eye EY and the horizontal direction (the Z-axis direction in FIGS. 1A and 1B). The angle θ is calculated using the positive direction of the Z-axis shown in FIGS. 1A and 1B as a reference in a range of from +0 to +180° in counterclockwise rotation and a range of from −0 to −180° in clock rotation.

When the orientation of the viewer's eye EY relative to the reference position is in the up, down, left, and right directions, the eyeball position calculating unit 92 calculates a distance indicating how far a position at which an arrow (for example, the arrow directed from the reference position to the position of the dark part of the eye) indicating the direction in which the eye EY faces intersects with the reflector 6 is apart from the center of the reflector 6. When the arrow indicating the direction in which the eye EY faces as viewed from the frame 2 side is in the up direction, the eyeball position calculating unit 92 calculates a distance in the positive Y-direction (refer to FIGS. 1A and 1B). When the arrow indicating the direction in which the eye EY faces as viewed from the frame 2 side is in the down direction, the eyeball position calculating unit 92 calculates a distance in the negative Y-direction (refer to FIGS. 1A and 1B). When the arrow indicating the direction in which the eye EY faces as viewed from the frame 2 side is in the right direction, the eyeball position calculating unit 92 calculates a distance in the positive Z-direction (refer to FIGS. 1A and 1B). When the arrow indicating the direction in which the eye EY faces as viewed from the frame 2 side is in the left direction, the eyeball position calculating unit 92 calculates a distance in the negative Z-direction (refer to FIGS. 1A and 1B).

For example, by previously storing information indicating a relation between the position of the dark part of the eye and the distance in the memory 902, the eyeball position calculating unit 92 can calculate the distance from the orientation of the eye EY relative to the reference position obtained in Step S100.

The image deforming unit 93 deforms an image signal based on the orientation of the viewer's eye EY relative to the reference position obtained in Step S100, and outputs the image signal to the signal generating unit 33 (Step S102). The image deforming unit 93 deforms an image using, for example, an affine transformation, and transforms an image signal so that the deformed image is displayed. The affine transformation is defined by the mathematical expressions (1) and (2).

$$\begin{pmatrix} x' \\ y' \\ 1 \end{pmatrix} = \begin{pmatrix} \cos\theta & -\sin\theta & 0 \\ \sin\theta & \cos\theta & 1 \\ 1 & 0 & 1 \end{pmatrix} \begin{pmatrix} x \\ y \\ 1 \end{pmatrix} \quad (1)$$

$$\begin{pmatrix} x' \\ y' \\ 1 \end{pmatrix} = \begin{pmatrix} 1 & 0 & 0 \\ 0 & 1 & 0 \\ tz & ty & 1 \end{pmatrix} \begin{pmatrix} x \\ y \\ 1 \end{pmatrix} \quad (2)$$

The mathematical expression (1) is an expression for obtaining the position of a point (x', y') when rotating any point (x, y) of an image signal by the angle θ. In the mathematical expression (1), the angle θ is the angle θ calculated in Step S100. With this configuration, an image is inclined at the same angle as the inclination of the eye EY, so that a horizontal image is incident on the eye EY.

The mathematical expression (2) is an expression for obtaining the position of a point (x', y') when translating any point (x, y) of an image signal. In the mathematical expression (2), tz is the distance in the Z-direction calculated in Step S100, and ty is the distance in the Y-direction calculated in Step S100. The affine transformation is a common technique, and therefore, the detailed description thereof is omitted. As a result of the affine transformation, an image can be translated by a distance corresponding to the orientation of the viewer's eye EY relative to the reference position, or an image can be rotationally moved by an angle corresponding to the angle of the viewer's eye EY relative to the reference position. In this case, even when an image is not rotated, a horizontal image is incident on the eye EY. The distance for translation or the angle for rotational movement is calculated based on, for example, the number of pixels. However, the invention is not limited thereto.

The image deforming unit 93 outputs the image signal deformed as described above to the signal generating unit 33, and then, as has been described above, a virtual image (image) based on the deformed image signal is displayed on the reflector 6.

In Step S102, the image signal is rotationally moved or translated. However, the image deforming unit 93 may perform both of rotational movement and translation depending on the acquired position of the eye EY.

The main control unit 91 determines whether or not an instruction to end image display is input via a button (not shown) or the like (Step S104). If the instruction to end image display is not input (NO in Step S104), the main control unit 91 controls the eyeball position calculating unit 92 to perform Step S100 again. If the instruction to end image display is input (YES in Step S104), the main control unit 91 ends the processing.

According to the first embodiment, since an image is moved based on the orientation of the viewer's eye relative to the reference position, it is possible to display an image that is kept more accurately horizontal to the viewer. When an image is rotationally moved or translated corresponding to the rotation angle of the viewer's head, an image that is accurately kept horizontal cannot be displayed on the viewer's eye due to optokinetic eye movement. In the first embodiment, in contrast, an image can be rotated so as to have the same orientation as that of the viewer's eye relative to the reference position, or an image can be moved so as to be centered on the forward line of sight of the viewer. Therefore, the viewer can be less prone to eye strain.

In the first embodiment, the same processing is performed by the eyeball position acquiring unit 8 and the control unit 9 that are provided on each of the right and left sides of the frame 2. However, the eyeball position acquiring unit 8 may be provided only on one of the right and left sides of the frame 2. In this case, the control unit 9 is provided around the center of the frame 2, and outputs an image signal to both of the signal output unit 3 provided on the right side of the frame 2 and the signal output unit 3 provided on the left side of the frame 2.

Moreover, the eyeball position acquiring unit 8 may be provided on the right and left sides of the frame 2, and only one control unit 9 may be provided around the center of the frame 2. In this case, the control unit 9 may deform an image based on an average value of the position of the eye based on the eyeball position acquiring unit 8 on the right side and the position of the eye based on the eyeball position acquiring unit 8 on the left side.

However, when the control unit 9 moves a right-eye image corresponding to the position of the eye based on the eyeball position acquiring unit 8 on the right side and moves a left-eye image corresponding to the position of the eye based on the eyeball position acquiring unit 8 on the left side, much better advantageous effect can be produced for a viewer having a disorder in the function of the eye such as strabismus.

In the first embodiment, infrared light is radiated to the viewer's eye EY, and the orientation of the eye EY relative to the reference position is obtained based on reflected light of the radiated light (limbus tracking method). However, a method of obtaining the orientation of the viewer's eye EY relative to the reference position is not limited thereto. For example, the orientation of the viewer's eye EY relative to the reference position may be obtained by radiating infrared light to the viewer's eye EY and capturing a virtual image on the cornea by an infrared camera (corneal reflex method). Moreover, the iris of the eye EY may be captured by an imaging device such as a camera, the pattern of the iris may be extracted by feature extraction or the like, and the orientation of the eye EY relative to the reference position may be obtained based on the pattern of the iris.

Second Embodiment

In the first embodiment of the invention, an image is moved based on the orientation of the viewer's eye relative to the reference position. However, a method by which the viewer is less prone to eye strain is not limited thereto.

In a second embodiment of the invention, the reflector 6 is rotated or moved based on the orientation of the viewer's eye relative to the reference position. Hereinafter, an image display device (head-mounted display) 1A according to the second embodiment will be described. The same portions as those of the first embodiment are denoted by the same reference and numeral signs, and the description thereof is omitted.

Figure 10:
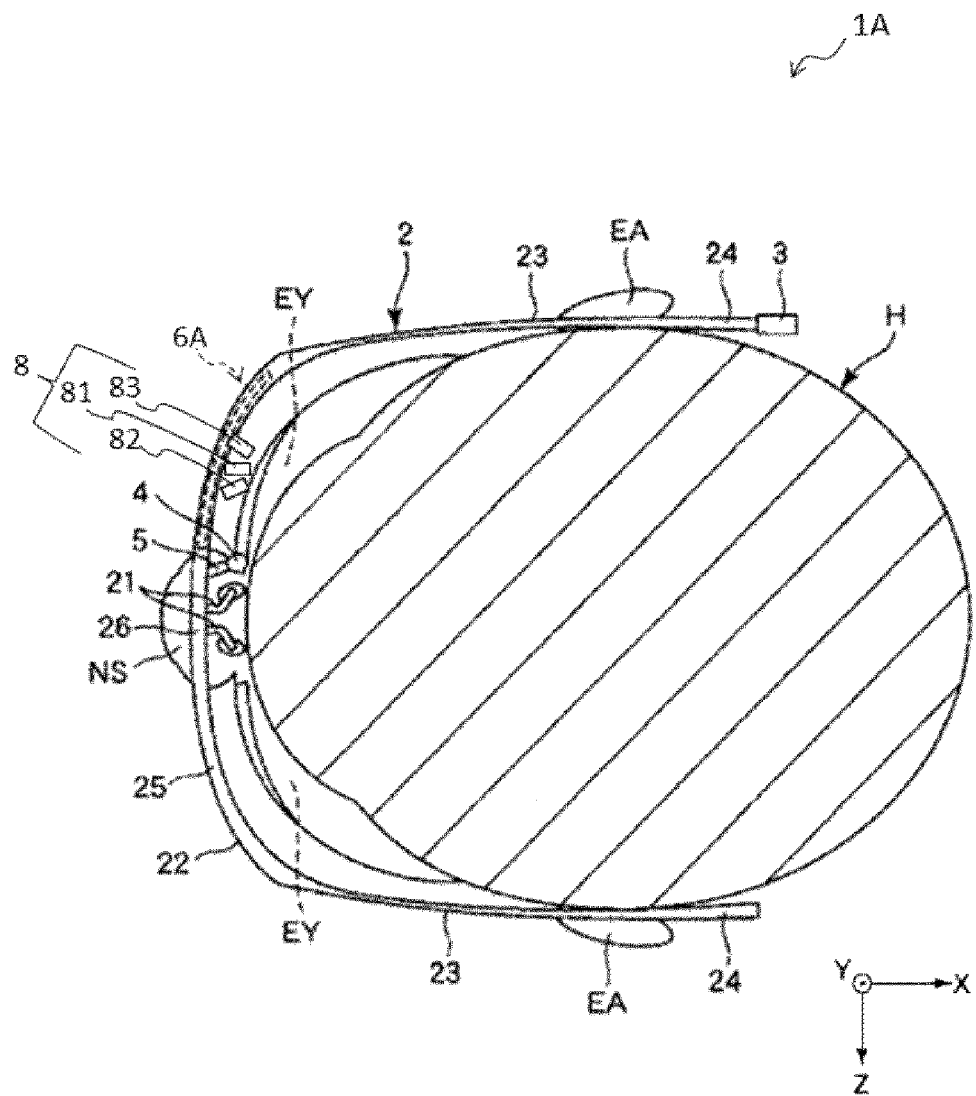
FIG. 10 shows an example of a schematic configuration of an image display device according to a second embodiment of the invention.

As shown in FIG. 10, the image display device 1A includes the frame 2, the signal output unit 3, the scanning light emitting unit 4, the impact absorbing unit 5, a reflecting unit 6A, the optical fiber 7, the eyeball position acquiring unit 8, and a control unit 9A.

Reflecting Unit

As shown in FIG. 10, the reflecting unit 6A is attached to the rim portion 25 included in the front portion 22 of the frame 2.

Figure 11:
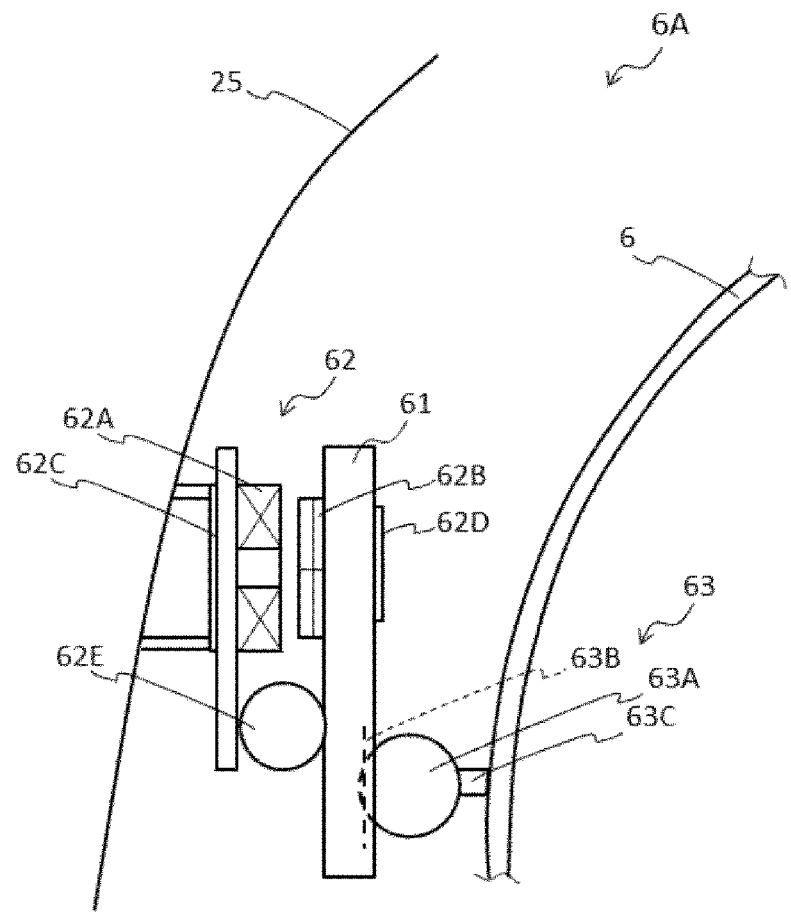
FIG. 11 shows an example of a schematic configuration of a reflector.

FIG. 11 schematically shows the reflecting unit 6A. FIG. 11 shows the interior of the rim portion 25 in a see-through manner. The reflecting unit 6A includes the reflector 6, a moving frame 61, antivibration actuators 62, and an attaching portion 63. The reflector 6 reflects signal light from the light scanning unit 42 toward the viewer's eye. The moving frame 61 is attached to the rim portion 25 so as to be freely translatable in the up, down, left, and right directions. The attaching portion 63 rotationally movably attaches the reflector 6 to the moving frame 61.

The antivibration actuator 62 is provided at two places within the moving frame 61, for example, at an edge of the moving frame 61 in the negative Z-direction and at an edge thereof in the positive Y-direction. In FIG. 11, only the antivibration actuator 62 provided at the edge of the moving frame 61 in the negative Z-direction is shown. The antivibration actuator 62 provided at the edge of the moving frame 61 in the negative Z-direction and the antivibration actuator 62 provided at the edge of the moving frame 61 in the positive Y-direction are arranged so as to form a right angle therebetween.

The antivibration actuator 62 includes mainly a driving coil 62A attached to the rim portion 25 and a driving magnet 62B attached to the moving frame 61 at a position facing the driving coil 62A.

Moreover, the antivibration actuator 62 includes an attracting yoke 62C and a back yoke 62D. The attracting yoke 62C is attached on the back side of the driving coil 62A for causing the moving frame 61 to be attracted to the rim portion 25 with a magnetic force of the driving magnet 62B. The back yoke 62D is attached on the opposite surface of the driving magnet to effectively direct the magnetic force of the driving magnet to the rim portion 25. These constitute a driving unit that causes a driving force to act between the rim portion 25 and the moving frame 61 and drives the moving frame 61 (that is, the reflector 6) in a direction parallel to the rim portion 25.

Moreover, the antivibration actuator 62 includes three balls 62E. The balls 62E are arranged on the circumference of the same circle at intervals of a central angle of substantially 120° between the rim portion 25 and the moving frame 61 (only one ball 62E is shown in FIG. 11). The ball 62E is provided partially in a recess formed in the moving frame 61, so that the fall of the ball is prevented. With this configuration, the moving frame 61 is supported on a plane parallel to the rim portion 25, and the balls 62E roll while being interposed between the rim portion 25 and the moving frame 61, so that the translational motion of the moving frame 61 relative to the rim portion 25 is permitted in any direction.

The lower-left corner of the driving magnet 62B in FIG. 11 is the south pole, the lower-right corner thereof is the north pole, the upper-left corner thereof is the north pole, and the upper-right corner thereof is the south pole. Since the driving magnet 62B is magnetized in this manner, the driving magnet 62B exerts magnetism on the long-side portion of the driving coil 62A. With this configuration, when current flows through the driving coil 62A, a driving force in the horizontal direction or the vertical direction is generated between the driving coil 62A and the driving magnet 62B. The antivibration actuator 62 is common, and therefore, the detailed description thereof is omitted.

The attaching portion 63 is provided on the moving frame 61 on the side opposite to the rim portion 25. The attaching portion 63 includes mainly a rotating ball 63A, rotational mechanisms each including a rotary shaft 63B that rotates the rotating ball 63A in any direction, and an attaching portion 63C that is fixed so as to project from the rotating ball 63A and to which the reflector 6 is attached.

The rotating ball 63A is provided partially in a recess provided in the moving frame 61.

Two rotational mechanisms are provided in the orthogonal direction so as to be located next to the rotating ball 63A. The rotational mechanisms include the rotary shafts 63B and actuators (not shown) that rotate the rotary shafts 63B. By rotating the two rotary shafts 63B provided in the orthogonal direction by any amount, the rotating ball 63A, that is, the reflector 6 can be rotated by a desired amount.

As described above, the attaching portion 63 constitutes a driving unit that rotationally drives the moving frame 61 (that is, the reflector 6) in the pitch direction or the yaw direction. The mechanism of the attaching portion 63 is common, and therefore, the detailed description thereof is omitted.

Control Unit

The control unit 9A is provided in the frame 2 at, for example, a position next to the signal output unit 3 (not shown in FIG. 10). The control unit 9A is electrically connected with the signal output unit 3, the reflecting unit 6A, and the eyeball position acquiring unit 8.

Figure 12:
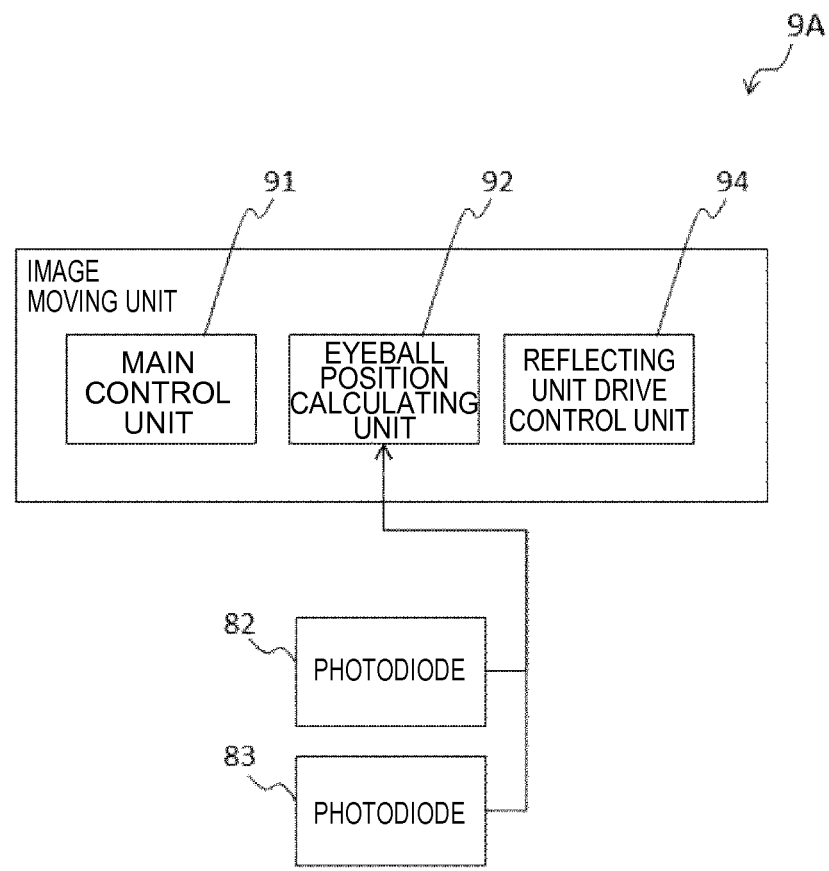
FIG. 12 shows an example of a functional configuration of a control unit.

FIG. 12 shows an example of a functional configuration of the control unit 9A. The control unit 9A includes mainly the main control unit 91, the eyeball position calculating unit 92, and a reflecting unit drive control unit 94.

The reflecting unit drive control unit 94 moves the moving frame 61 and the rotating ball 63A based on the orientation of the eye EY relative to the reference position calculated by the eyeball position calculating unit 92. The processing of the reflecting unit drive control unit 94 will be described in detail later. The reflecting unit drive control unit 94 corresponds to the image moving unit according to the invention.

Figure 13:
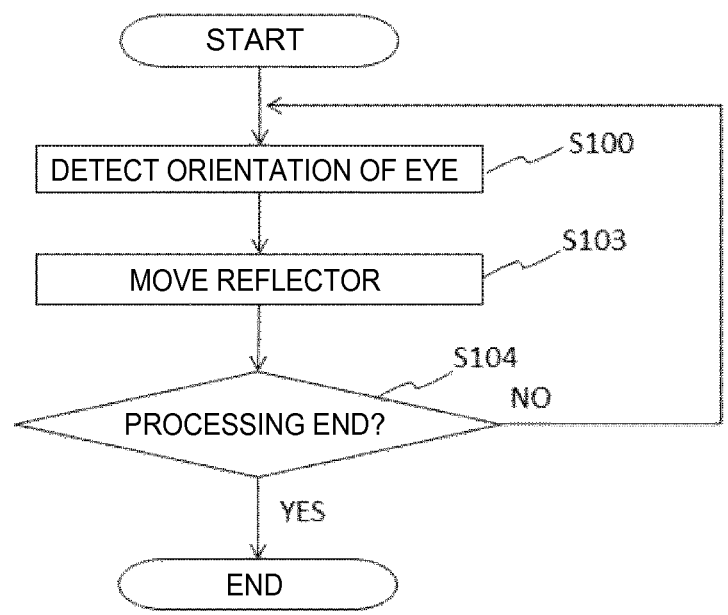
FIG. 13 is a flowchart showing the flow of image moving processing of the image display device.

FIG. 13 is a flowchart showing the flow of processing to move an image based on the orientation of the viewer's eye EY relative to the reference position. This processing starts at any timing, for example, with the input of an instruction, via a button or the like (not shown), to start image display.

The processing shown in FIG. 13 is performed by the eyeball position acquiring unit 8 and the control unit 9A that are provided on each of the right and left sides of the frame 2 at the same timing.

The eyeball position calculating unit 92 acquires reflected light acquired by the photodiodes 82 and 83, and calculates the orientation of the eye EY relative to the reference position (Step S100).

The reflecting unit drive control unit 94 moves the reflector 6 based on the orientation of the viewer's eye EY relative to the reference position obtained in Step S100 (Step S103). The processing in Step S103 will be specifically described.

For example, a case will be described, in which in Step S100, the orientation of the viewer's eye EY relative to the reference position is in the up, down, left, and right directions, and a distance d indicating how far a position at which an arrow indicating the direction in which the eye EY faces intersects with the reflector 6 is apart from the center of the reflector 6 is calculated by the eyeball position calculating unit 92. For example, information indicating a relation between the distance d and the moving direction and moving amount of the moving frame 61 is previously stored in the memory 902. The reflecting unit drive control unit 94 acquires the information from the memory 902 and controls the driving unit of the antivibration actuator 62 to move the moving frame 61 in the calculated direction by the calculated distance.

For example, a case will be described, in which in Step S100, the orientation of the viewer's eye EY relative to the reference position is in an oblique direction, and the angle θ formed between the vector indicating the orientation of the eye EY and the horizontal direction (the Z-axis direction in FIGS. 1A and 1B) is calculated by the eyeball position calculating unit 92. For example, information indicating the relation between the angle θ formed between the vector indicating the orientation of the eye EY and the horizontal direction and the moving direction and moving amount of the rotating ball 63A is previously stored in the memory 902. The reflecting unit drive control unit 94 acquires the information from the memory 902 and calculates the moving direction and moving amount (rotation angle) of the rotating ball 63A. Moreover, the reflecting unit drive control unit 94 controls the actuator (that is, the attaching portion 63) that rotates the rotary shaft to rotate the rotating ball 63A in the calculated moving direction by the calculated moving amount (rotation angle).

With this configuration, the reflector 6 is rotationally moved or translated by the amount corresponding to the orientation of the viewer's eye EY relative to the reference position. In addition to the rotation of the rotating ball 63A, the reflecting unit drive control unit 94 may move the moving frame 61. A method of controlling the driving unit of the antivibration actuator 62 and a method of controlling the actuator that rotates the rotary shaft are common methods, and therefore, the detailed description thereof is omitted.

The main control unit 91 determines whether or not an instruction to end image display is input via a button (not shown) or the like (Step S104). If the instruction to end image display is not input (NO in Step S104), the main control unit 91 controls the eyeball position calculating unit 92 to perform Step S100 again. If the instruction to end image display is input (YES in Step S104), the main control unit 91 ends the processing.

According to the second embodiment, since the reflecting unit is moved based on the orientation of the viewer's eye relative to the reference position, it is possible to display an image that is kept more accurately horizontal to the viewer. Therefore, the viewer can be less prone to eye strain.

Third Embodiment

In the first embodiment of the invention, an image is moved by directly detecting the orientation of the viewer's eye relative to the reference position. However, a method of detecting the orientation of the viewer's eye relative to the reference position is not limited thereto.

In a third embodiment of the invention, the orientation of the eye relative to the reference position is obtained from the inclination of the viewer's head. Hereinafter, an image display device (head-mounted display) 1B according to the third embodiment will be described. The same portions as those of the first embodiment are denoted by the same reference and numeral signs, and the description thereof is omitted.

Figure 14:
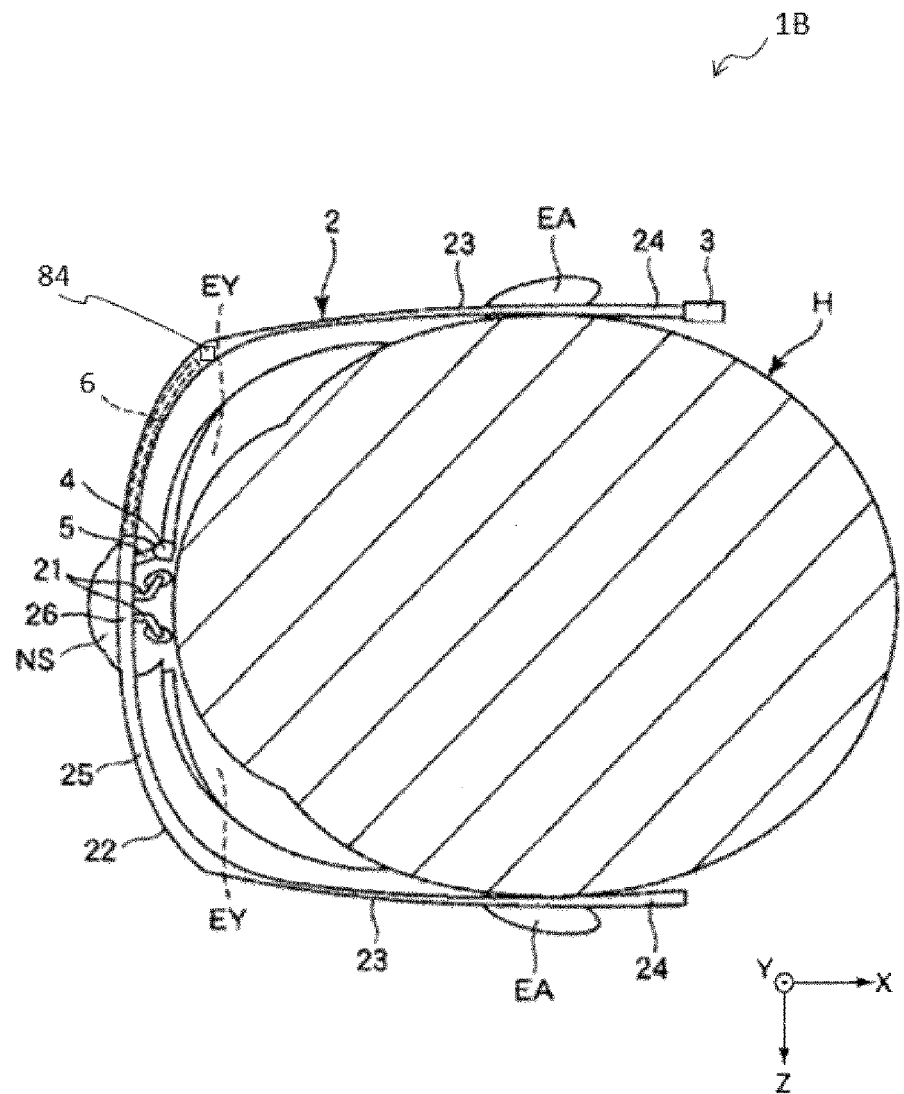
FIG. 14 shows an example of a schematic configuration of an image display device according to a third embodiment of the invention.

As shown in FIG. 14, the image display device 1B includes the frame 2, the signal output unit 3, the scanning light emitting unit 4, the impact absorbing unit 5, the reflector 6, the optical fiber 7, a control unit 9B, and a gyro sensor 84.

The gyro sensor 84 is provided at any position of the frame 2. The gyro sensor 84 is, for example, a mechanical gyro sensor and detects the inclination, angular velocity, and the like of the image display device 1B. The gyro sensor 84 corresponds to a head inclination acquiring unit according to the invention. The gyro sensor is common, and therefore, the description thereof is omitted.

Control Unit

The control unit 9B is provided in the frame 2 at, for example, a position next to the signal output unit 3 (not shown in FIG. 14). The control unit 9B is electrically connected with the signal output unit 3 and the eyeball position acquiring unit 8.

Figure 15:
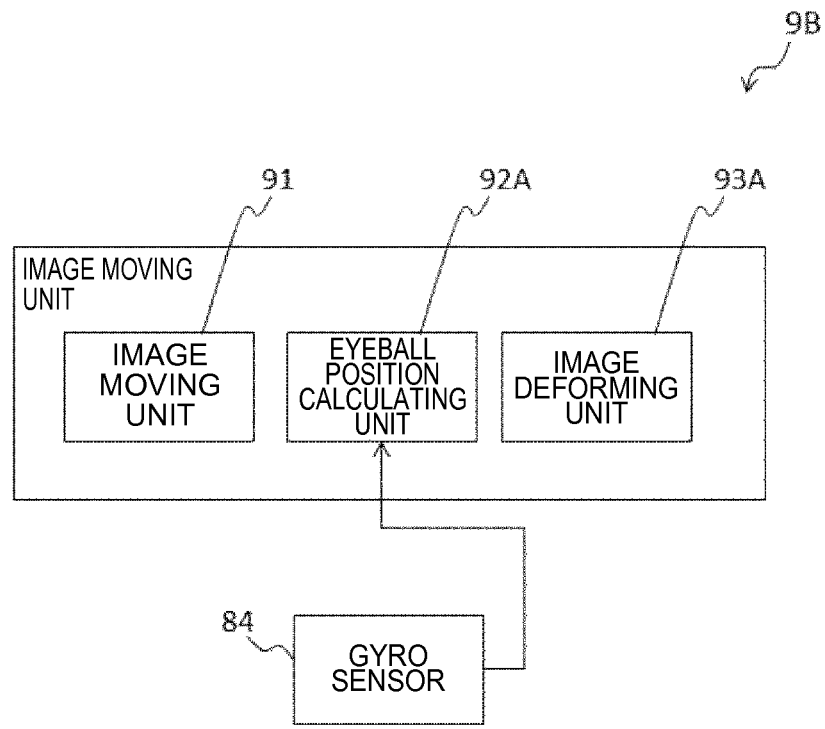
FIG. 15 shows an example of a functional configuration of a control unit.

FIG. 15 shows an example of a functional configuration of the control unit 9B. The control unit 9B includes mainly the main control unit 91, an eyeball position calculating unit 92A, and an image deforming unit 93A.

The eyeball position calculating unit 92A calculates the orientation of the viewer's eye EY relative to the reference position based on the inclination of the image display device 1B acquired by the gyro sensor 84, that is, the inclination of the viewer's head. The processing of the eyeball position calculating unit 92A will be described in detail later.

The image deforming unit 93A deforms an image signal based on the orientation of the eye EY relative to the reference position calculated by the eyeball position calculating unit 92A. The content of specific processing of the image deforming unit 93A is the same as that of the image deforming unit 93, and therefore, the description thereof is omitted.

Figure 16:
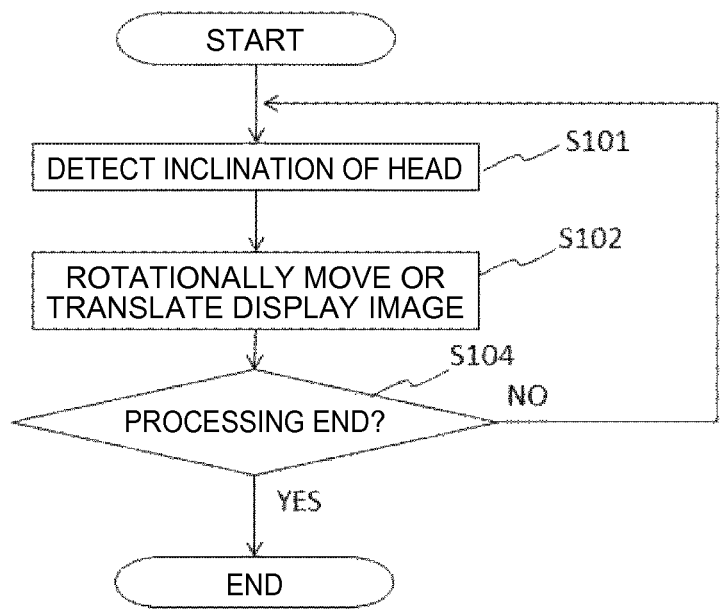
FIG. 16 is a flowchart showing the flow of image moving processing of the image display device.

FIG. 16 is a flowchart showing the flow of processing to move an image based on the orientation of the viewer's eye EY relative to the reference position. This processing starts at any timing, for example, with the input of an instruction, via a button or the like (not shown), to start image display.

The processing shown in FIG. 16 is performed by the control unit 9B that is provided on each of the right and left sides of the frame 2 at the same timing.

The eyeball position calculating unit 92A acquires the inclination of the viewer's head acquired by the gyro sensor 84, and calculates the orientation of the eye EY relative to the reference position (Step S101). For example, eyeball information as information in which the inclination of the head and the orientation of the eye EY relative to the reference position are associated with each other is stored in the memory 902. The eyeball position calculating unit 92A acquires the information and acquires the orientation of the eye EY relative to the reference position corresponding to the acquired inclination of the head, so that the orientation of the eye EY relative to the reference position can be calculated. The eyeball position calculating unit 92A corresponds to the eyeball position acquiring unit and an eyeball information acquiring unit according to the invention.

The image deforming unit 93A deforms an image signal based on the orientation of the viewer's eye EY relative to the reference position obtained in Step S101, and outputs the image signal to the signal generating unit 33 (Step S102). With this configuration, a virtual image (image) based on the deformed image signal is displayed on the reflector 6. The image deforming unit 93A corresponds to the image moving unit according to the invention.

The main control unit 91 determines whether or not an instruction to end image display is input via a button (not shown) or the like (Step S104). If the instruction to end image display is not input (NO in Step S104), the main control unit 91 controls the eyeball position calculating unit 92A to perform Step S100 again. If the instruction to end image display is input (YES in Step S104), the main control unit 91 ends the processing.

According to the third embodiment, since the orientation of the eye relative to the reference position is calculated from the inclination of the head, it is more simply possible to display an image that is kept more accurately horizontal to the viewer compared with the case where the orientation of the eye relative to the reference position is directly detected. Moreover, in the third embodiment, since the orientation of the eye relative to the reference position is calculated from the inclination of the head, it is possible to display an image that is kept horizontal to the viewer compared with the case where an image is rotated corresponding to the inclination of the head.

Moreover, in the third embodiment, since the infrared ray emission unit and the infrared ray photodiode are not used, power consumption of the image display device can be reduced.

Fourth Embodiment

In the first embodiment of the invention, the orientation of the viewer's eye relative to the reference position is directly detected to move an image. However, a method of detecting the orientation of the viewer's eye relative to the reference position is not limited thereto.

In a fourth embodiment of the invention, the method of directly detecting the orientation of the viewer's eye relative to the reference position and the method of obtaining the orientation of the eye relative to the reference position from the inclination of the viewer's head are switched from one to the other. Hereinafter, an image display device (head-mounted display) 1C according to the fourth embodiment will be described. The same portions as those of the first embodiment and the third embodiment are denoted by the same reference and numeral signs, and the description thereof is omitted.

Figure 17:
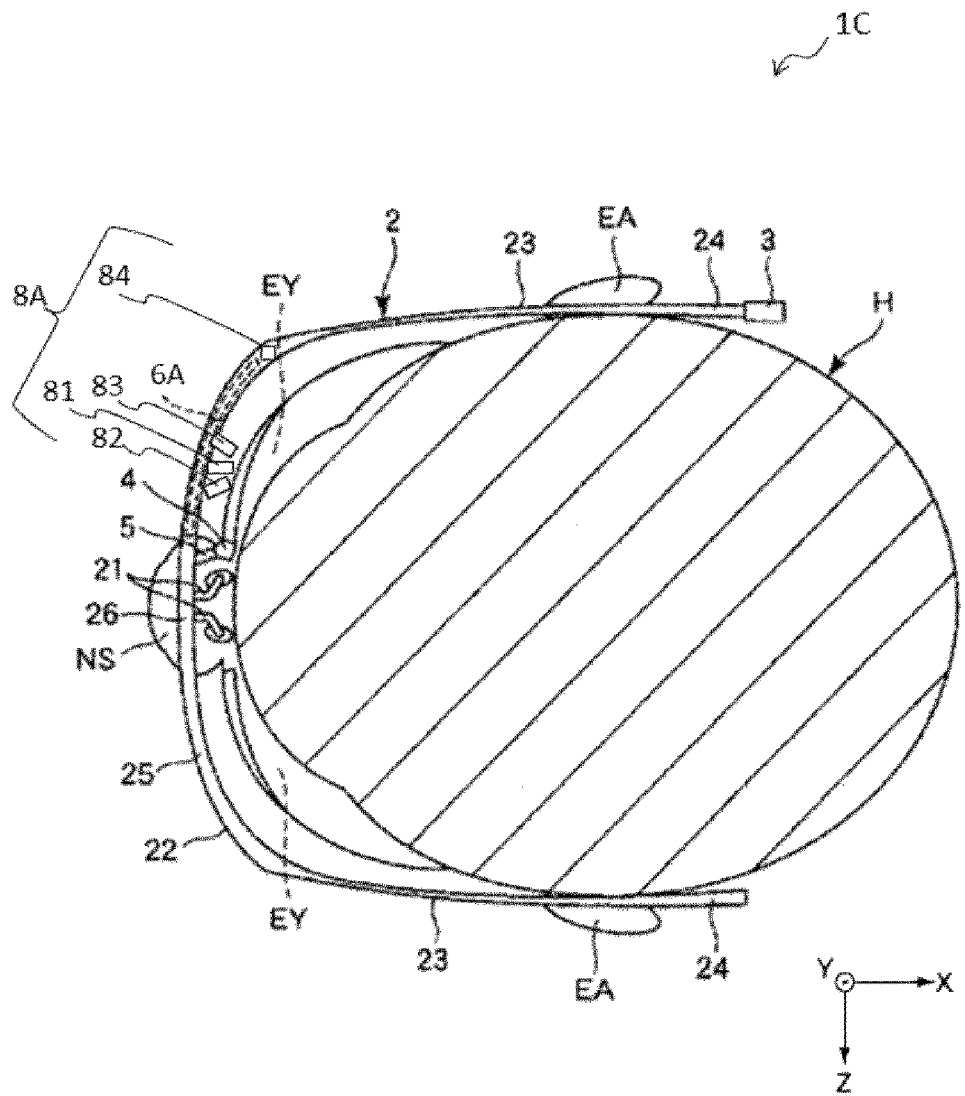
FIG. 17 shows an example of a schematic configuration of an image display device according to a fourth embodiment of the invention.

As shown in FIG. 17, the image display device 1C includes the frame 2, the signal output unit 3, the scanning light emitting unit 4, the impact absorbing unit 5, the reflecting unit 6A, the optical fiber 7, an eyeball position acquiring unit 8A, and a control unit 9C.

Eyeball Position Acquiring Unit

The eyeball position acquiring unit 8A includes mainly the infrared ray emission unit 81, the photodiodes 82 and 83, and the gyro sensor 84. The eyeball position acquiring unit 8A corresponds to the eyeball position acquiring unit according to the invention.

Control Unit

The control unit 9C is provided in the frame 2 at, for example, a position next to the signal output unit 3 (not shown in FIG. 17). The control unit 9C is electrically connected with the signal output unit 3 and the eyeball position acquiring unit 8A.

Figure 18:
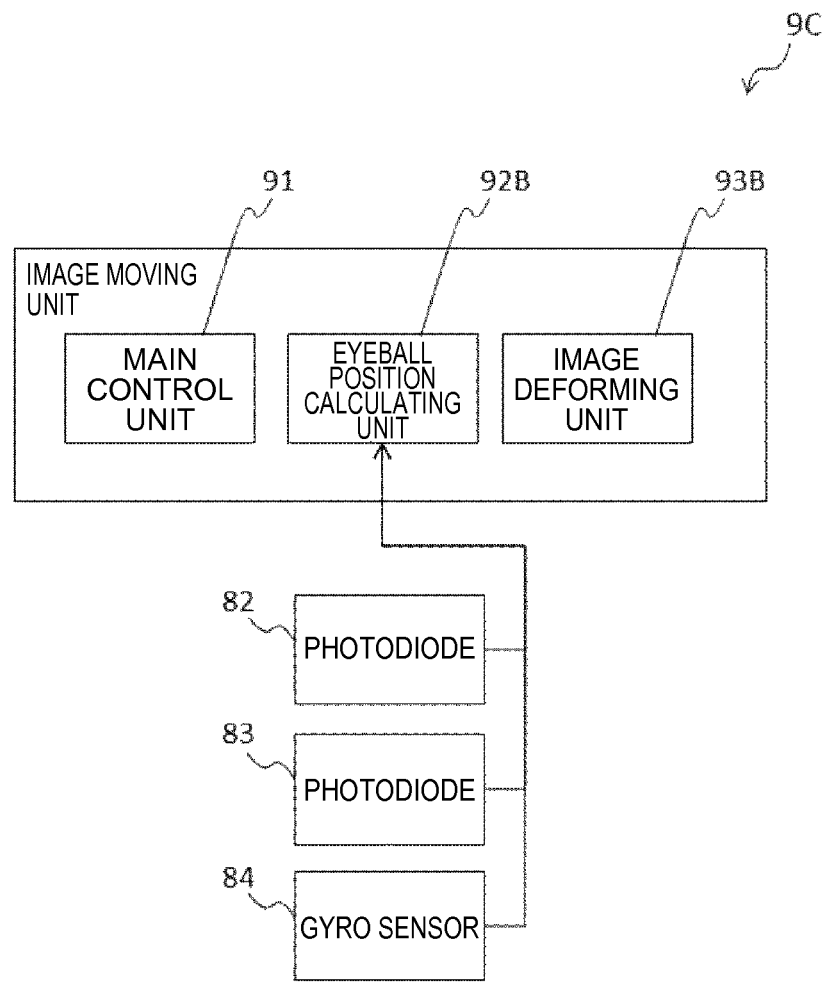
FIG. 18 shows an example of a functional configuration of a control unit.

FIG. 18 shows an example of a functional configuration of the control unit 9C. The control unit 9C includes mainly the main control unit 91, an eyeball position calculating unit 92B, and an image deforming unit 93B.

The eyeball position calculating unit 92B calculates the orientation of the viewer's eye EY relative to the reference position based on reflected light acquired by the photodiodes 82 and 83, or based on the inclination of the image display device 1C acquired by the gyro sensor 84, that is, the inclination of the viewer's head. The processing of the eyeball position calculating unit 92B will be described in detail later. The eyeball position calculating unit 92B corresponds to the eyeball position acquiring unit according to the invention.

The image deforming unit 93B deforms an image signal based on the orientation of the eye EY relative to the reference position calculated by the eyeball position calculating unit 92B. The content of specific processing of the image deforming unit 93B is the same as that of the image deforming unit 93, and therefore, the description thereof is omitted. The image deforming unit 93B corresponds to the image moving unit according to the invention.

Figure 19:
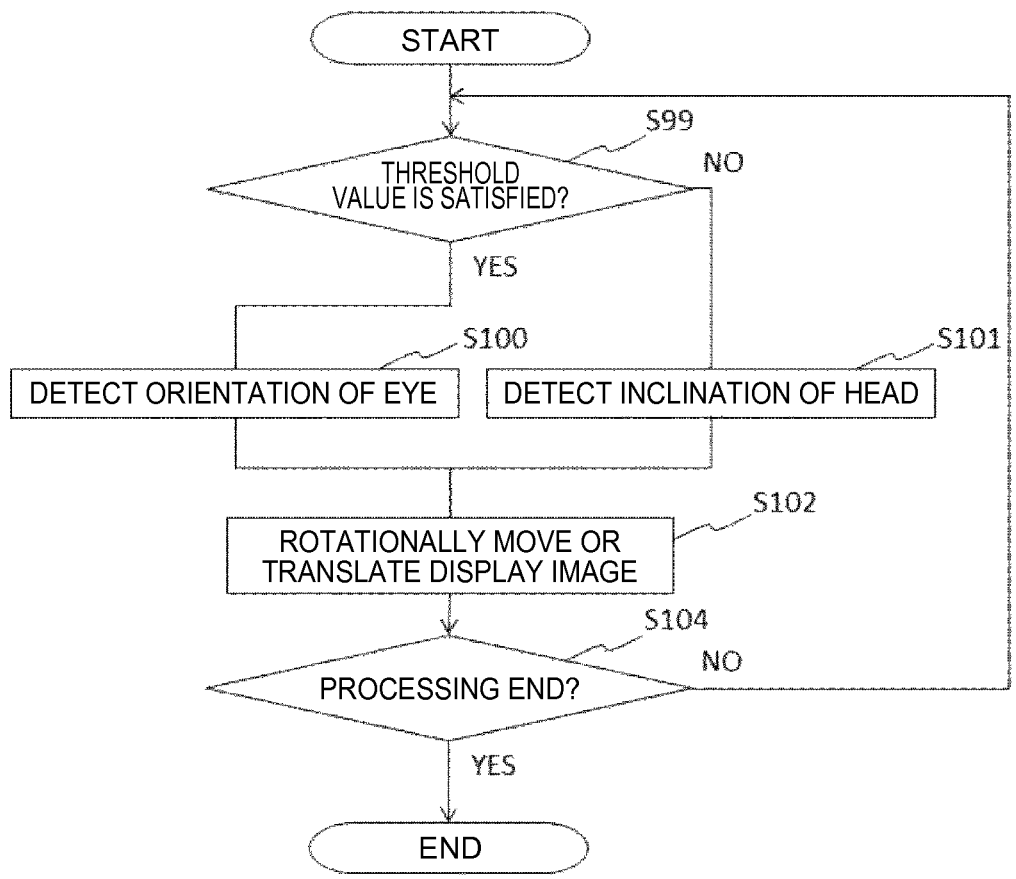
FIG. 19 is a flowchart showing the flow of image moving processing of the image display device.

FIG. 19 is a flowchart showing the flow of processing to move an image based on the orientation of the viewer's eye EY relative to the reference position. This processing starts at any timing, for example, with the input of an instruction, via a button or the like (not shown), to start image display.

The processing shown in FIG. 19 is performed by the control unit 9C that is provided on each of the right and left sides of the frame 2 at the same timing.

The main control unit 91 determines whether or not a predetermined threshold value is satisfied (Step S99). As examples of the case of satisfying the predetermined threshold value, the following cases, for example, are considered: the inclination of the image display device 1C acquired by the gyro sensor 84 is a constant angle (for example, 30°, 40°, or the like) or more; and the inclination of the image display device 1C acquired by the gyro sensor 84 is a constant angle (for example, 30°, 40°, or the like) or less but the angular velocity of the image display device 1C acquired by the gyro sensor 84 has a constant value or more. The predetermined threshold value is not limited to these cases. The threshold value may be determined as being satisfied when a constant time has elapsed after starting the measurement of the orientation of the eye EY relative to the reference position, or when the inclination of the image display device 1C (that is, the head) is a constant angle or more and a constant time has elapsed. It is desirable to set the threshold value such that the threshold value is satisfied under the situation where differences among individuals are large or the situation where a difference becomes large depending on the presence or absence of a disorder in the function of the eye.

These predetermined threshold values are stored in the memory 902, and the main control unit 91 acquires the threshold value therefrom. The main control unit 91 compares the acquired threshold value with the result acquired from the eyeball position acquiring unit 8A to determine whether or not the predetermined threshold value is satisfied.

If the predetermined threshold value is satisfied (YES in Step S99), the main control unit 91 (corresponding to an instruction output unit according to the invention) outputs an instruction to the eyeball position calculating unit 92B to acquire the reflected light acquired by the photodiodes 82 and 83 and calculate the orientation of the eye EY relative to the reference position. The eyeball position calculating unit 92B calculates the orientation of the eye EY relative to the reference position based on the reflected light acquired by the photodiodes 82 and 83 (Step S100).

If the predetermined threshold value is not satisfied (NO in Step S99), the main control unit 91 (corresponding to the instruction output unit according to the invention) outputs an instruction to the eyeball position calculating unit 92B to acquire the inclination of the viewer's head acquired by the gyro sensor 84 and calculate the orientation of the eye EY relative to the reference position. The eyeball position calculating unit 92B calculates the orientation of the eye EY relative to the reference position based on the inclination of the viewer's head acquired by the gyro sensor 84 (Step S101).

The image deforming unit 93B deforms an image signal based on the orientation of the viewer's eye EY relative to the reference position obtained in Step S100 or Step S101, and outputs the image signal to the signal generating unit 33 (Step S102). With this configuration, a virtual image (image) based on the deformed image signal is displayed on the reflecting unit 6A.

The main control unit 91 determines whether or not an instruction to end image display is input via a button (not shown) or the like (Step S104). If the instruction to end image display is not input (NO in Step S104), the main control unit 91 controls the eyeball position calculating unit 92B to perform Step S100 again. If the instruction to end image display is input (YES in Step S104), the main control unit 91 ends the processing.

According to the fourth embodiment, the direct detection of the orientation of the eye relative to the reference position and the calculation of the orientation of the eye relative to the reference position from the inclination of the head are switched from one to the other. Therefore, compared with the case where the orientation of the eye relative to the reference position is directly detected, it is possible to accurately display an image that is kept horizontal to the viewer while lowering power consumption. This is because the power consumption of the gyro sensor is lower compared with the power consumption of the infrared ray emission unit and the photodiode. That is, according to the fourth embodiment, both of accuracy and power saving can be achieved.

While the invention has been described above in conjunction with the embodiments, the technical range of the invention is not limited to the scope of the embodiments. It will be apparent to those skilled in the art that various modifications or improvements can be added to the embodiments. It will also be apparent from the scope of the appended claims that embodiments added with such modifications or improvements are included in the technical range of the invention. Moreover, the invention is not limited to an image display device but can be provided as an image display method performed in an image display device, a program that causes an image display device to perform image display, a storage medium having the program stored therein, and the like.

Especially in the embodiments, the invention has been described with reference to the head-mounted display (head-mounted image display device) having an eyeglasses-like appearance by way of example. However, the invention is not limited to the head-mounted display. For example, the invention can be applied to a mobile apparatus such as a mobile phone or a tablet terminal.

For example, in a mobile apparatus, an imaging unit (a common camera or the like can be used) is provided on a surface (surface facing the viewer's eye) on which an image display unit such as a liquid crystal panel is provided. The imaging unit acquires an image of the viewer's face. A line-of-sight acquiring unit performs, based on the face image acquired by the imaging unit, recognition processing such as feature quantity calculation or shape determination on the viewer's left and right eyeballs as objects, and acquires a line-of-sight direction of the viewer through line-of-sight detection processing using, for example, the center position of the iris of the eye, the center position of the eyeball, or the like. The line-of-sight detection processing is common processing, and therefore, the description thereof is omitted.

The eyeball position calculating unit of the control unit acquires the orientation of the viewer's eye relative to the reference position based on the orientation of the line of sight acquired by the line-of-sight acquiring unit. For example, the eyeball position calculating unit uses the orientation of the line of sight as the orientation of the eye relative to the reference position. The image deforming unit of the control unit deforms an image based on the acquired orientation of the eye relative to the reference position. The image deforming unit may not output a portion of the image, which extends from the image display unit when deforming the image, to the image display unit, or reduce the size of the image so that the entire deformed image is displayed. As the mobile apparatus, a mobile apparatus having a common configuration can be used.

The entire disclosure of Japanese Patent Application No. 2013-140424, filed Jul. 4, 2013 is expressly incorporated by reference herein.

What is claimed is:

1. An image display device comprising:
    a frame that is mounted for use on a head of a viewer, the frame having a front frame member and a temple frame member;
    an image display unit that is provided in the frame and that displays an image;
    an eyeball position acquiring unit that is provided in the frame and that acquires an orientation of an eye of a viewer relative to a reference position; and
    an image moving unit that is provided in the frame and that translates the image display unit or the image displayed on the image display unit by a distance corresponding to the orientation of the eye relative to the reference position or rotationally moves the image display unit or the image displayed on the image display unit by an angle corresponding to the orientation of the eye relative to the reference position, wherein
    the eyeball position acquiring unit is located at a midpoint between a center of the front frame member and a corner, the corner being where the front frame member and the temple frame member meet one another, and
    the eyeball position acquiring unit is configured with:
        one light radiating unit; and
        two light detectors that are respectively provided on both sides of the one light radiating unit,
    wherein the one light radiating unit and the two light detectors are linearly provided alarm the front frame.

2. The image display device according to claim 1,
    wherein the light radiating unit is provided in the front frame and radiates light to the viewer's eye, wherein
    the eyeball position acquiring unit acquires the orientation of the viewer's eye relative to the reference position based on the light radiated by the light radiating unit.

3. The image display device according to claim 1, further comprising:
    a head inclination acquiring unit that is provided in the frame and acquires an inclination of the viewer's head; and
    an eyeball information acquiring unit that acquires eyeball information in which the inclination of the viewer's head and the orientation of the viewer's eye relative to the reference position are associated with each other, wherein
    the eyeball position acquiring unit acquires the orientation of the viewer's eye relative to the reference position based on the inclination of the viewer's head and the eyeball information.

4. The image display device according to claim 1, further comprising:
    a head inclination acquiring unit that is provided in the frame and acquires an inclination of the viewer's head;
    an eyeball information acquiring unit that acquires eyeball information in which the inclination of the viewer's head and the orientation of the viewer's eye relative to the reference position are associated with each other; and
    an instruction output unit that outputs, to the eyeball position acquiring unit based on a threshold value, an instruction as to how to acquire the orientation of the viewer's eye relative to the reference position, wherein
    the light radiating unit is provided in the front frame and radiates light to the viewer's eye, and
    the eyeball position acquiring unit acquires, based on the instruction of the instruction output unit, the orientation of the viewer's eye relative to the reference position based on reflected light of the light radiated to the eye by the light radiating unit, or acquires the orientation of the viewer's eye relative to the reference position based on the inclination of the viewer's head and the eyeball information.

5. The image display device according to claim 1, further comprising a line-of-sight acquiring unit that acquires a line-of-sight direction of the viewer, wherein
    the eyeball position acquiring unit acquires the orientation of the viewer's eye relative to the reference position based on the line-of-sight direction of the viewer.

6. The image display device according to claim 1, further comprising a driving unit that translates or rotationally moves the image display unit, wherein
    the image moving unit controls the driving unit to move the image display unit by an amount corresponding to the orientation of the eye relative to the reference position.

7. The image display device according to claim 1, wherein the image moving unit includes
    an image transforming unit that translates or rotationally moves the image displayed on the image display unit by an amount corresponding to the orientation of the eye relative to the reference position, and
    an image output unit that outputs the image translated or rotationally moved by the image transforming unit to the image display unit.

8. An image display device comprising:
a frame that is mounted for use on a head of a viewer, the frame having a front frame member and a temple frame member;
an image display unit that displays an image;
an eyeball position acquiring unit that is provided in the frame and that acquires an orientation of an eye of a viewer relative to a reference position; and
an image moving unit that translates the image display unit or the image displayed on the image display unit by a distance corresponding to the orientation of the eye relative to the reference position or rotationally moves the image display unit or the image displayed on the image display unit by an angle corresponding to the orientation of the eye relative to the reference position,
the eyeball position acquiring unit is located at a midpoint between a center of the front frame member and a corner, the corner being where the front frame member and the temple frame member meet one another, and
wherein the eyeball position acquiring unit includes an infrared ray emission unit and photodiodes, the photodiodes are respectively provided at both sides of the infrared ray emission unit, and the infrared ray emission unit and the photodiodes are linearly provided along the front frame.

9. The image display device according to claim 8, further comprising:
a line-of-sight acquiring unit that acquires a line-of-sight direction of the viewer,
wherein the eyeball position acquiring unit acquires the orientation of the viewer's eye relative to the reference position based on the line-of-sight direction of the viewer.

10. The image display device according to claim 8, further comprising:
a driving unit that translates or rotationally moves the image display unit,
wherein the image moving unit controls the driving unit to move the image display unit by an amount corresponding to the orientation of the eye relative to the reference position.

11. The image display device according to claim 8, wherein
the image moving unit includes:
an image transforming unit that translates or rotationally moves the image displayed on the image display unit by an amount corresponding to the orientation of the eye relative to the reference position; and
an image output unit that outputs the image translated or rotationally moved by the image transforming unit to the image display unit.

* * * * *